United States Patent
Kim et al.

(10) Patent No.: US 9,319,902 B2
(45) Date of Patent: Apr. 19, 2016

(54) METHOD FOR RECEIVING DOWNLINK SIGNAL BY STATION IN WIRELESS COMMUNICATION SYSTEM

(71) Applicant: LG ELECTRONICS INC., Seoul (KR)

(72) Inventors: Jeongki Kim, Anyang-si (KR); Yongho Seok, Anyang-si (KR); Jinsam Kwak, Anyang-si (KR); Jinsoo Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/420,611

(22) PCT Filed: Aug. 9, 2013

(86) PCT No.: PCT/KR2013/007209
§ 371 (c)(1),
(2) Date: Feb. 9, 2015

(87) PCT Pub. No.: WO2014/025232
PCT Pub. Date: Feb. 13, 2014

(65) Prior Publication Data
US 2015/0223081 A1    Aug. 6, 2015

Related U.S. Application Data

(60) Provisional application No. 61/681,143, filed on Aug. 9, 2012, provisional application No. 61/716,626, filed on Oct. 22, 2012.

(51) Int. Cl.
*H04W 4/00* (2009.01)
*H04W 24/02* (2009.01)
*H04W 76/02* (2009.01)
*H04W 84/12* (2009.01)
*H04W 88/08* (2009.01)

(52) U.S. Cl.
CPC ............ *H04W 24/02* (2013.01); *H04W 76/028* (2013.01); *H04W 84/12* (2013.01); *H04W 88/08* (2013.01)

(58) Field of Classification Search
CPC ... H04W 24/02; H04W 76/028; H04W 84/12; H04W 88/08
See application file for complete search history.

(56) References Cited

U.S. PATENT DOCUMENTS

| | | | | |
|---|---|---|---|---|
| 2004/0098586 | A1* | 5/2004 | Rebo | H04L 63/0869 713/169 |
| 2004/0156336 | A1* | 8/2004 | McFarland | H04L 1/22 370/329 |
| 2005/0122921 | A1* | 6/2005 | Seo | H04W 48/16 370/310 |

(Continued)

OTHER PUBLICATIONS

Zheng, et al., "Low-Power PS-Poll," IEEE 802.11-12/0608r2, May 2012, 14 pages.

(Continued)

*Primary Examiner* — Clemence Han
(74) *Attorney, Agent, or Firm* — Lee, Hong, Degerman, Kang & Waimey PC; Jonathan Kang; Justin Lee

(57) ABSTRACT

The invention relates to a method for receiving a downlink signal from an access point (AP) by a station (STA) in a wireless communication system, comprising the steps of: transmitting an uplink frame; and receiving a response frame as a response to the uplink frame. A terminal performs a re-association with the AP when it is recognized, via the response frame, that the AP has been restarted.

16 Claims, 16 Drawing Sheets

(56) References Cited

U.S. PATENT DOCUMENTS

| | | | |
|---|---|---|---|
| 2007/0049252 A1* | 3/2007 | Smith | H04L 1/188 455/411 |
| 2007/0060128 A1 | 3/2007 | Kil | |
| 2008/0097858 A1* | 4/2008 | Vucina | G06Q 20/20 705/14.12 |
| 2008/0137621 A1* | 6/2008 | Bheda | H04W 24/04 370/338 |
| 2009/0073923 A1* | 3/2009 | Homma | H04W 60/00 370/328 |
| 2010/0014507 A1* | 1/2010 | Linkola | H04W 12/08 370/352 |
| 2010/0313262 A1* | 12/2010 | Mehta | H04L 63/0823 726/12 |
| 2011/0261797 A1* | 10/2011 | Yamaguchi | H04W 72/048 370/338 |
| 2012/0089834 A1* | 4/2012 | Li | H04W 12/04 713/168 |
| 2014/0043999 A1* | 2/2014 | Bugenhagen | H04W 24/02 370/252 |

OTHER PUBLICATIONS

Zheng, et al., "Supporting Low Power Operation," IEEE 802.11-12/0409r5, May 2012, 12 pages.

Chu, et al., "Enhancement of Low Power Medium Access STA's," IEEE 802.11-12/0343r3, May 2012, 5 pages.

Park, "Proposed Specification Framework for TGah," IEEE 802.11-11/1137r10, Jul. 2012, 30 pages.

PCT International Application No. PCT/KR2013/007209, Written Opinion of the International Searching Authority dated Nov. 21, 2013, 18 pages.

* cited by examiner

METHOD FOR RECEIVING DOWNLINK SIGNAL BY STATION IN WIRELESS COMMUNICATION SYSTEM

CROSS-REFERENCE TO RELATED APPLICATIONS

This application is the National Stage filing under 35 U.S.C. 371 of International Application No. PCT/KR2013/007209, filed on Aug. 9, 2013, which claims the benefit of U.S. Provisional Application Ser. Nos. 61/681,143, filed on Aug. 9, 2012 and 61/716,626, filed on Oct. 22, 2012, the contents of which are all hereby incorporated by reference herein in their entirety.

TECHNICAL FIELD

The present invention relates to a wireless communication system, and more particularly, to a method of receiving a downlink signal when an access point is restarted in a wireless LAN system.

BACKGROUND ART

Recently, various wireless communication technologies are developing in accordance with development of an information communication technology. Among the various wireless communication technologies, wireless LAN (WLAN) corresponds to a technology enabling a user to access the Internet in wireless in a home, an enterprise or an area to which a specific service is provided using such a portable terminal as a PDA (personal digital assistant), a laptop computer, a PMP (portable multimedia player) and the like based on a radio frequency technology.

In order to overcome a limitation on communication speed, which is blamed for a weak point of WLAN, a recent technology standard has introduced a system of which network speed and reliability are increased and managing distance of a wireless network is extended. For instance, IEEE 802.11n supports HT (high throughput) that maximum data processing speed is greater than 540 Mbps and application of MIMO (multiple inputs and multiple outputs) technology using multiple antennas at both an transmitting end and a receiving end is introduced to minimize a transmission error and optimize data speed.

DISCLOSURE OF THE INVENTION

Technical Tasks

As a next generation communication technology, an M2M (machine-to-machine) communication technology is now under discussion. In IEEE 802.11 WLAN system, a technology standard to support the M2M communication is also developing in the name of IEEE 802.11ah. In the M2M communication, it may consider a scenario communicating a small amount of data from time to time at low speed in environment in which tremendous number of devices exist.

In a wireless LAN system, communication is performed in a medium shared by all devices. In case that the number of devices increases like M2M communication, it is necessary to efficiently improve a channel access mechanism to reduce unnecessary power consumption and interference occurrence.

A technical task of the present invention is to provide a method of receiving a downlink signal of a non-TIM STA when an AP is restarted in a wireless LAN system and an apparatus therefor.

Technical tasks obtainable from the present invention are non-limited the above-mentioned technical task. And, other unmentioned technical tasks may be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of receiving a downlink signal, received by a station (STA) from an access point (AP) in a wireless communication system includes the steps of transmitting an uplink frame and receiving a response frame in response to the uplink frame. the STA performs re-association with the AP when restart of the AP is recognized via the response frame.

To further achieve these and other advantages and in accordance with the purpose of the present invention, according to a second technical aspect of the present invention, a station (STA) in a wireless communication system includes a transceiver configured to transceive a radio signal and a processor, the processor configured to transmit an uplink frame, to receive a response frame in response to the uplink frame, to perform re-association with the AP when restart of an AP is recognized via the response frame.

The first to the second technical aspect of the present invention may include one or more items described in the following.

Whether the AP is restated may be checked by an AP restart count included in the response frame.

The STA recognizes it as the AP is restarted when the AP restart count is greater than a stored AP count.

The response frame may include at least one of a TSF (time stamp field) and AP recovery indication.

The AP recovery indication may include at least one of an AID (association identifier), TWT (target wake-up time), TSF and MAC header information.

The recovery indication may correspond to indication indicating to transmit an information element included in the recovery indication.

Performing the re-association may include the steps of transmitting an AP recovery request to the AP and receiving an AP recovery response from the AP.

The AP recovery request may include an information element contained in AP recovery indication which is included in the response frame.

The information element included in the AP recovery indication may be used for updating a corresponding information element of the AP.

The STA may further receive an ACK frame before the response frame is received.

The ACK frame may indicate that the response frame is to be transmitted.

The STA may transmit the uplink frame in TWT or a listen interval.

The STA may correspond to a non-TIM (traffic indication MAP) STA.

The response frame may correspond to one selected from the group consisting of an ACK frame, an NDP ACK frame, a downlink data frame and a response frame.

The uplink frame may correspond to one selected from the group consisting of a PS-poll frame, a trigger frame and an uplink data frame.

Advantageous Effects

According to the present invention, although an AP is restarted, a non-TIM STA may stably perform re-association, uplink data transmission and the like.

Effects obtainable from the present invention may be non-limited by the above mentioned effect. And, other unmentioned effects may be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
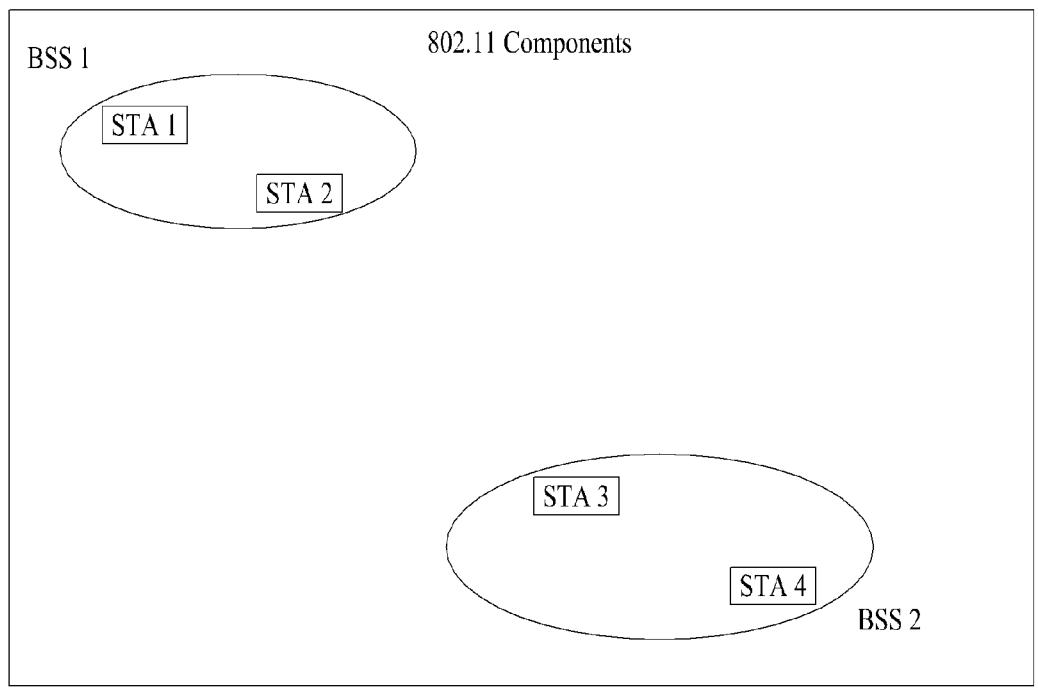
FIG. 1 is a diagram for an example of a structure of IEEE 802.11 system to which the present invention is applicable.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, known structures and devices are omitted or are shown in block diagram form, focusing on important features of the structures and devices, so as not to obscure the concept of the invention. Like reference numerals denote the same components throughout the specification.

The embodiments of the present invention may be supported by standard documents disclosed for at least one of wireless access systems, Institute of Electrical and Electronics Engineers (IEEE) 802, $3^{rd}$, Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Further, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA), etc. While the embodiments of the present invention will be described below in the context of an IEEE 802.11 system for clarity of description, this is purely exemplary and thus should not be constructed as limiting the present invention.

Architecture of Wireless Local Area Network (WLAN) System

FIG. 1 illustrates an exemplary configuration of an IEEE 802.11 system to which the present invention is applicable.

The IEEE 802.11 architecture may include a plurality of components. A WLAN that supports Station (STA) mobility transparent to upper layers may be provided through interaction between the components. A Basic Service Set (BSS) is a basic building block of an IEEE 802.11 LAN. FIG. 1 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it may no longer communicate directly with other members of the BSA.

An Independent Basic Service Set (IBSS) is the most basic type of BSS in the IEEE 802.11 LAN. For example, a minimum IBSS includes only two stations. A BSS, BSS1 or BSS2 which is the most basic type without other components in FIG. 1 may be taken as a major example of the IBSS. This configuration may be realized when STAs communicate directly. Because this type of LAN is often formed without pre-planning for only as long as the LAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

Figure 2:
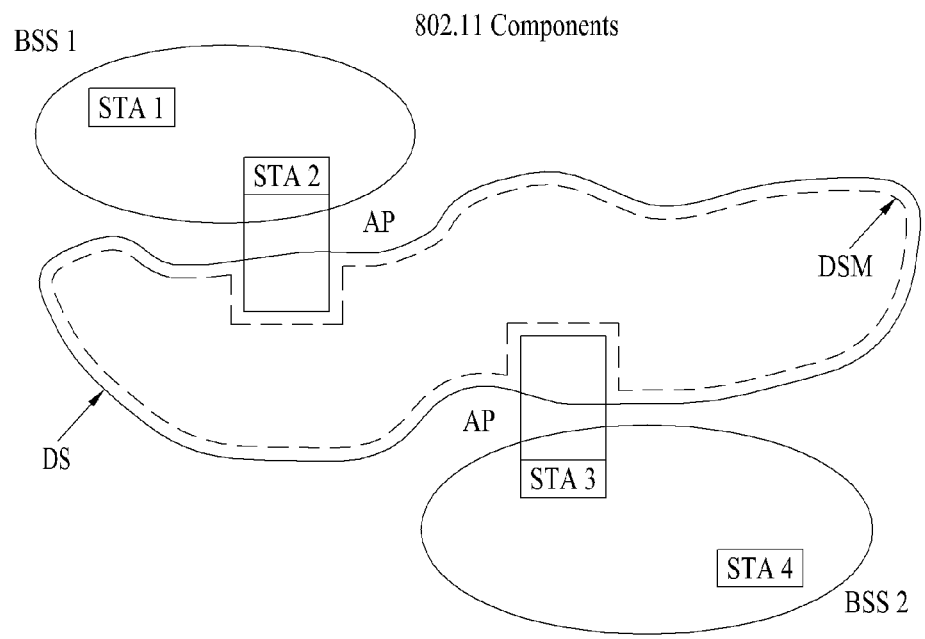
FIG. 2 is a diagram for a different example of a structure of IEEE 802.11 system to which the present invention is applicable.

FIG. 2 illustrates another exemplary configuration of the IEEE 802.11 system to which the present invention is applicable. In FIG. 2, components such as a Distribution System (DS), a Distribution System Medium (DSM), and an Access Point (AP) are added to the architecture illustrated in FIG. 1.

Physical (PHY) performance may limit direct STA-to-STA distances. While this distance limitation is sufficient in some cases, communication between STAs apart from each other by a long distance may be required. To support extended coverage, a DS may be deployed.

A DS is built from multiple BSSs that are interconnected. Specifically, a BSS may exist as a component of an extended network with a plurality of BSSs, rather than it exists independently as illustrated in FIG. 1.

The DS is a logical concept and may be specified by the characteristics of a DSM. In this regard, the IEEE 802.11 standard logically distinguishes a Wireless Medium (WM) from a DSM. Each logical medium is used for a different purpose by a different component. The IEEE 802.11 standard does not define that these media should be the same or different. The flexibility of the IEEE 802.11 LAN architecture (DS structure or other network structures) may be explained in the sense that a plurality of media are logically different. That is, the IEEE 802.11 LAN architecture may be built in various manners and may be specified independently of the physical characteristics of each implementation example.

The DS may support mobile devices by providing services needed to handle address to destination mapping and seamless integration of multiple BSSs.

An Access Point (AP) is an entity that enables its associated STAs to access a DS through a WM and that has STA functionality. Data may move between the BSS and the DS through the AP. For example, STA2 and STA3 illustrated in FIG. 2 have STA functionality and provide a function of enabling associated STAs (STA1 and STA4) to access the DS. Since all APs are basically STAs, they are addressable entities. An address used by an AP for communication on the WM is not necessarily identical to an address used by the AP for communication on the DSM.

Data that one of STAs associated with the AP transmits to an STA address of the AP may always be received at an uncontrolled port and processed by an IEEE 802.1X port access entity. Transmission data (or frames) may be transmitted to the DS when a controlled port is authenticated.

Figure 3:
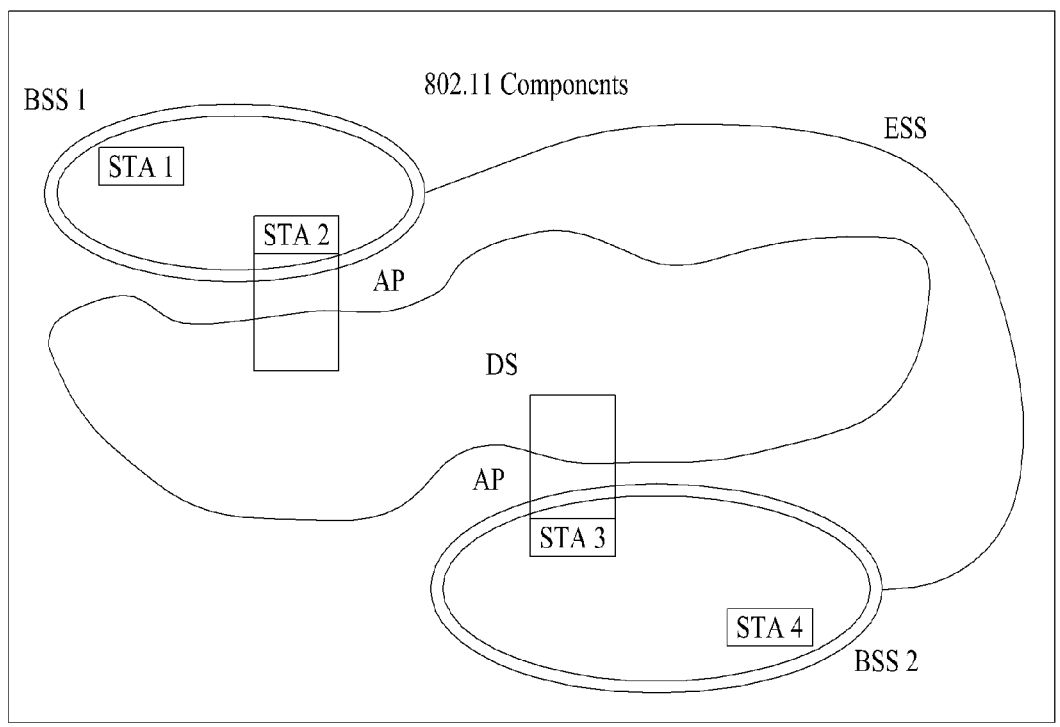
FIG. 3 is a diagram for a further different example of a structure of IEEE 802.11 system to which the present invention is applicable.

FIG. 3 illustrates another exemplary configuration of the IEEE 802.11 system to which the present invention is applicable. In addition to the architecture illustrated in FIG. 2, FIG. 3 conceptually illustrates an Extended Service Set (ESS) to provide extended coverage.

A DS and BSSs allow IEEE 802.11 to create a wireless network of arbitrary size and complexity. IEEE 802.11 refers to this type of network as an ESS network. An ESS may be a set of BSSs connected to a single DS. However, the ESS does not the DS. The ESS network appears as an IBSS network to a Logical Link Control (LLC) layer. STAs within an ESS may communicate with each other and mobile STAs may move from one BSS to another (within the same ESS) transparently to the LLC layer.

IEEE 802.11 assumes nothing about the relative physical locations of the BSSs in FIG. 3. All of the followings are possible. The BSSs may partially overlap. This is commonly used to arrange contiguous coverage. The BSSs may be physically disjointed. Logically, there is no limit to the distance between BSSs. The BSSs may be physically co-located. This may be done to provide redundancy. One (or more) IBSS or ESS networks may be physically present in the same space as one (or more) ESS networks. This may arise when an ad hoc network is operating at a location that also has an ESS network, when physically overlapping IEEE 802.11 networks have been set up by different organizations, or when two or more different access and security policies are needed at the same location.

Figure 4:
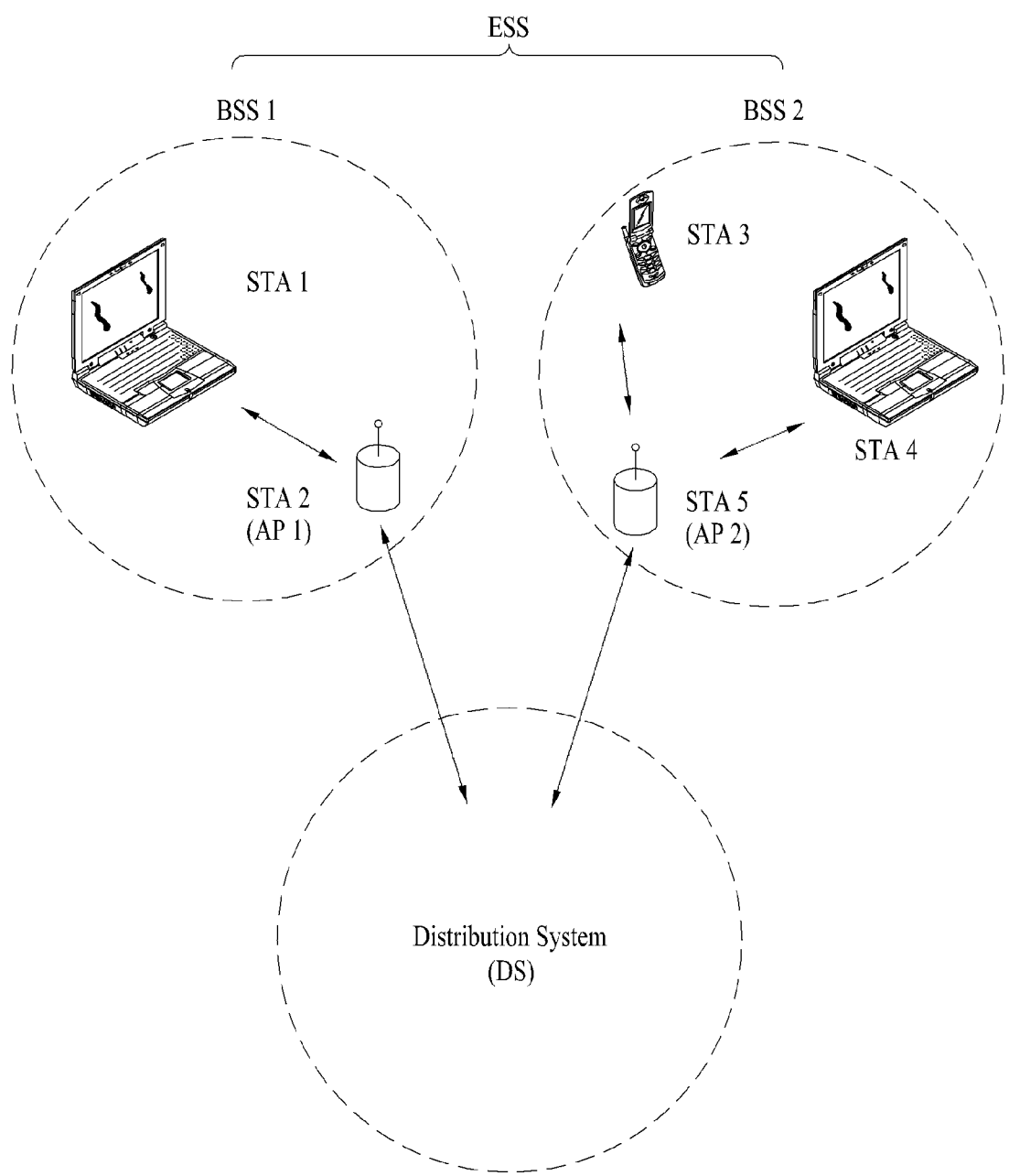
FIG. 4 is a diagram for an example of a structure of a wireless LAN system.

FIG. 4 illustrates an exemplary configuration of a WLAN system. In FIG. 4, an exemplary infrastructure BSS including a DS is illustrated.

In the example of FIG. 4, an ESS includes BSS1 and BSS2. In the WLAN system, an STA is a device complying with Medium Access Control/Physical (MAC/PHY) regulations of IEEE 802.11. STAs are categorized into AP STAs and non-AP STAs. The non-AP STAs are devices handled directly by users, such as laptop computers and mobile phones. In FIG. 4, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Link Setup Procedure

Figure 5:
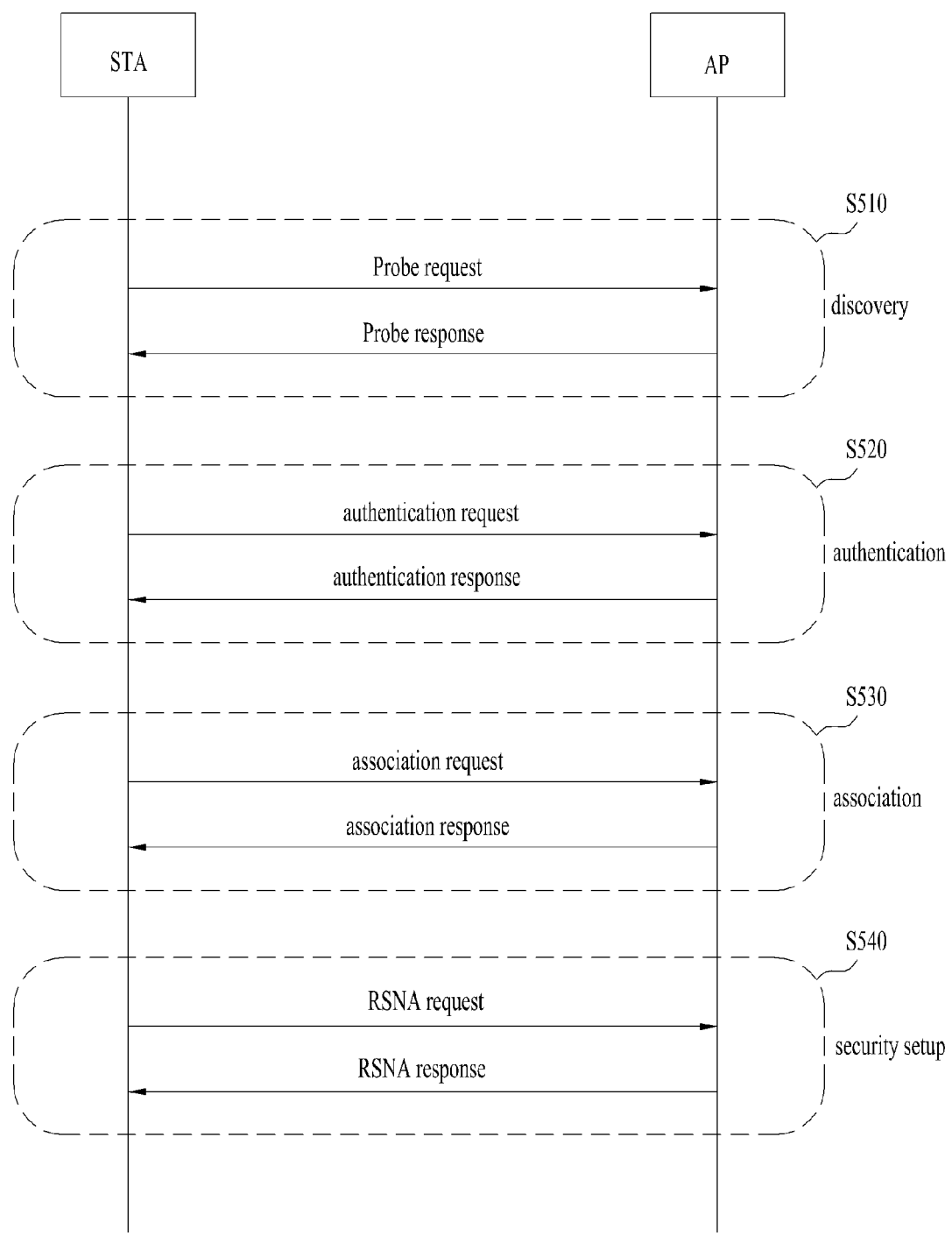
FIG. 5 is flowchart for explaining a link setup process in a wireless LAN system.

FIG. 5 is a view referred to for describing a general link setup procedure.

In order to establish a link with a network and transmit and receive data to and from the network, an STA should discover, authenticate, associate with, and perform an authentication procedure for security with the network. The link setup procedure may be referred to as a session initiation procedure or a session setup procedure. Discovery, authentication, association, and security setup of the link setup procedure may be collectively called an association procedure.

An exemplary link setup procedure will be described below with reference to FIG. 5.

In step S510, an STA may discover a network. The network discovery may include the STA's scanning. That is, the STA should search for a joinable network to access the network. The STA needs to identify a compatible network before joining a wireless network. Identification of a network present in a specific area is referred to as scanning Scanning is categorized into active scanning and passive scanning.

FIG. 5 illustrates a network discovery operation including active scanning, by way of example. An STA performing active scanning transmits a probe request frame and awaits reception of a response to the transmitted probe request frame, while switching between channels, to determine which AP is present around the STA. A responder transmits a probe response frame in response to the probe request frame to the STA that has transmitted the probe request frame. Here, the responder may be an STA that has transmitted a last beacon frame in a BSS of the scanned channel. Since an AP transmits a beacon frame in a BSS, the AP is a responder. Since STAs sequentially transmit a beacon frame, a responder is not the same in an IBSS. For example, an STA, which has transmitted a probe request frame in channel #1 and has received a probe response frame in channel #1, stores BSS-related information included in the received probe response frame, and moves to the next channel (e.g. channel #2). In the same manner, the STA may perform scanning on the next channel (i.e. probe request/response transmission and reception in channel #2).

While not shown in FIG. 5, the scanning may be passive scanning. An STA that performs passive scanning awaits reception of a beacon frame while moving from one channel to another. The beacon frame is one of management frames in IEEE 802.11. The beacon frame is periodically transmitted to announce the presence of a wireless network and allow a scanning STA to search for the wireless network and thus join the wireless network. In a BSS, an AP is configured to periodically transmit a beacon frame, whereas in an IBSS, STAs are configured to sequentially transmit a beacon frame. Upon receipt of a beacon frame, a scanning STA stores BSS-related information included in the beacon frame and moves to another channel. In this manner, the STA stores beacon frame information on each channel. Upon receipt of the beacon frame, the STA may store BSS-related information included in the received beacon frame, move to the next channel, and perform scanning on the next channel in the same manner.

Active scanning is more advantageous than passive scanning in terms of delay and power consumption.

After discovering the network, the STA may perform an authentication procedure in step S520. The authentication procedure may be referred to as a first authentication procedure to be distinguished from a security setup procedure performed in step S540.

The authentication procedure includes transmission of an authentication request frame to an AP by an STA and transmission of an authentication response frame to the STA by the AP in response to the authentication request frame. The authentication frame used for authentication request/response is a management frame.

The authentication frame may include information about an authentication algorithm number, an authentication transaction sequence number, a state code, challenge text, a Robust Security Network (RSN), a Finite Cyclic Group (FCG), etc. The above-mentioned information contained in the authentication frame is an exemplary part of information that may be included in the authentication request/response frame. The information may be replaced with other information or include additional information.

The STA may transmit the authentication request frame to the AP. The AP may determine whether to accept authentication of the STA based on the information included in the received authentication request frame. The AP may provide an authentication processing result to the STA in the authentication response frame.

After the STA is successfully authenticated, an association procedure may be performed in step S530. The association procedure includes transmission of an association request frame to the AP by the STA and transmission of an association response frame to the STA by the AP in response to the association request frame.

For example, the association request frame may include information related to various capabilities, a beacon listening interval, a Service Set Identifier (SSID), supported rates, supported channels, an RSN, a mobility domain, supported operating classes, a Traffic Indication Map (TIM) broadcast request, interworking service capability information, etc.

For example, the association response frame may include information associated with various capabilities, a status code, an Association Identification (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, etc.

The above-mentioned information is an exemplary part of information that may be included in the association request/response frame. The information may be replaced with other information or may include additional information.

After the STA is successfully associated with the network, a security setup procedure may be performed in step S540. The security setup process of step S540 may be referred to as an authentication procedure based on a Robust Security Network Association (RSNA) request/response. The authentication procedure of step S520 may be referred to as a first authentication procedure and the security setup procedure of step S540 may be referred to simply as an authentication procedure.

The security setup procedure of step S540 may include private key setup through 4-way handshaking, for example, by an Extensible Authentication Protocol over LAN (EAPOL) frame. In addition, the security setup procedure may be performed according to any other security scheme that is not defined in the IEEE 802.11 standard.

Evolution of WLAN

To overcome the limitations of WLAN in communication speed, IEEE 802.11n has recently been established as a communication standard. IEEE 802.11n seeks to increase network speed and reliability and extend wireless network coverage. More specifically, IEEE 802.11n supports a High Throughput (HT) of up to 540 Mbps or higher. To minimize transmission errors and optimize data rates, IEEE 802.11n is based on Multiple Input Multiple Output (MIMO) using a plurality of antennas at each of a transmitter and a receiver.

Along with the increased use of WLAN and the development of diverse WLAN-based applications, there is a pressing need for a new WLAN system that supports a higher throughput than a throughput supported by IEEE 802.11n. A next-generation WLAN system supporting a Very High Throughput (VHT) is the next version to IEEE 802.11n WLAN (e.g. IEEE 802.11ac). It is one of systems that have been recently proposed to support a data processing rate of 1 Gbps or higher in a MAC Service Access Point (SAP).

The next-generation WLAN system supports a Multi-User (MU)-MIMO transmission scheme in which a plurality of STAs simultaneously access a channel in order to efficiently utilize radio channels. In the MU-MIMO transmission scheme, an AP may transmit a packet to at least one MIMO-paired STA simultaneously.

In addition, support of a WLAN system operation in White Space (WS) is under discussion. For example, the introduction of a WLAN system in TV WS such as an idle frequency band (e.g. a 54 to 698 MHz band) due to transitioning from analog TV to digital TV has been discussed under the IEEE 802.11af standard. However, this is purely exemplary and the WS may be a licensed band that a licensed user may use with priority. The licensed user is a user who has authority to use the licensed band. The licensed user may also be referred to as a licensed device, a primary user, an incumbent user, etc.

For example, an AP and/or an STA operating in WS should protect a licensed user. For example, if a licensed user such as a microphone has already been using a specific WS channel, that is, a frequency band regulated to be divided by a specific bandwidth in the WS band, the AP and/or the STA are not allowed to use the frequency band of the WS channel in order to protect the licensed user. The AP and/or the STA should discontinue using the frequency band when the licensed user is to use a frequency band that the AP and/or STA is using for frame transmission and/or reception.

Therefore, the AP and/or the STA needs to determine whether the specific frequency band of the WS band is available, that is, whether a licensed user occupies the frequency band. Determination as to whether a licensed user is present in a specific frequency band is referred to as spectrum sensing. Energy detection scheme, signature detection, etc. are used as a spectrum sensing mechanism. The AP and/or the STA may determine that a licensed user is using the frequency band when the strength of a received signal is equal to or larger than a predetermined value or a DTV preamble is detected.

Machine-to-machine (M2M) communication is under discussion as a next-generation communication technology. A technical standard of supporting M2M communication has been developed as IEEE 802.11ah in the IEEE 802.11 WLAN system. M2M communication is a communication scheme involving one or more machines. M2M communication may also be called Machine Type Communication (MTC) or machine-to-machine communication. A machine is an entity that does not require direct manipulation or intervention of a user. For example, not only a meter or vending machine equipped with a wireless communication module but also a User Equipment (UE) such as a smartphone capable of automatically accessing a network and communicating with the network without user manipulation/intervention may be machines. M2M communication may include Device-to-Device (D2D) communication, communication between a device and an application server, etc. Examples of communication between a device and an application server include communication between a vending machine and a server, communication between a Point Of Sale (POS) device and a server, and communication between an electric meter, a gas meter, or a water meter and a server. M2M communication-based applications may also include security, transportation, healthcare, etc. Considering the foregoing application examples, M2M communication should support occasional transmission/reception of a small amount of data at low rate under an environment with a huger number of devices.

More specifically, M2M communication should support a large number of STAs. Although a currently defined WLAN system is based on the premise that up to 2007 STAs are associated with one AP, methods for supporting association of more (about 6000) STAs with a single AP have been discussed in M2M communication. It is expected that many applications will support/require low rates in M2M communication. To fulfill these requirements, an STA may recognize the presence or absence of data to receive based on a TIM element in the WLAN system. In this regard, methods for reducing the bitmap size of the TIM have been discussed. It is also expected that much traffic will have a very long transmission/reception interval in M2M communication. For example, a very small amount of data needs to be transmitted and received at long intervals (e.g. every month), as is the case with electric/gas/water metering. Accordingly, although more and more STAs can be associated with a single AP in the WLAN system, methods for efficiently supporting a case in which a very small number of STAs are supposed to receive data frames from the AP during one beacon interval have been discussed.

As described above, the WLAN technology is rapidly evolving. Aside from the above-described examples, other techniques for performing direct link setup, improving media streaming throughput, supporting high-speed and/or large-scale initial session setup, and supporting extended bandwidth and operating frequency are being developed.

Medium Access Mechanism

In a WLAN system complying with IEEE 802.11, a basic access mechanism of the MAC layer is Carrier Sense Multiple Access with Collision Avoidance (CSMA/CA). The CSMA/CA mechanism is also referred to as Distributed Coordination Function (DCF) of the IEEE 802.11 MAC layer, which basically adopts a "listen before talk" access mechanism. In this type of access mechanism, an AP and/or an STA may sense a wireless channel or a medium during a predetermined time period (e.g. DCF Inter-Frame Space (DIFS)) by Clear Channel Assessment (CCA) before starting transmission. If the AP and/or the STA determines that the medium is idle as a result of the sensing, the AP and/or the STA starts frame transmission using the medium. On the other hand, if the AP and/or the STA determines that the medium is occupied, the AP and/or the STA does not start its transmission. Instead, the AP and/or the STA may attempt to perform frame transmission after setting a delay time (e.g. a random backoff period) for medium access and waiting for the delay time. As it is expected that multiple STAs attempt to perform frame transmission after waiting for different time periods by applying random backoff periods, collision may be minimized An IEEE 802.11 MAC protocol provides a Hybrid Coordination Function (HCF) which is based on a DCF and a Point Coordination Function (PCF). The PCF is a polling-based synchronous access scheme in which periodic polling is performed periodically to allow all receiving APs and/or STAs to receive a data frame. The HCF includes Enhanced Distributed Channel Access (EDCA) and HCF Controlled Channel Access (HCCA). EDCA is a contention-based access scheme used for a provider to provide a data frame to a plurality of users, and HCCA is a contention-free channel access scheme based on polling. The HCF includes a medium access mechanism for improving QoS of a WLAN. In the HCF, QoS data may be transmitted during both a Contention Period (CP) and a Contention-Free period (CFP).

Figure 6:
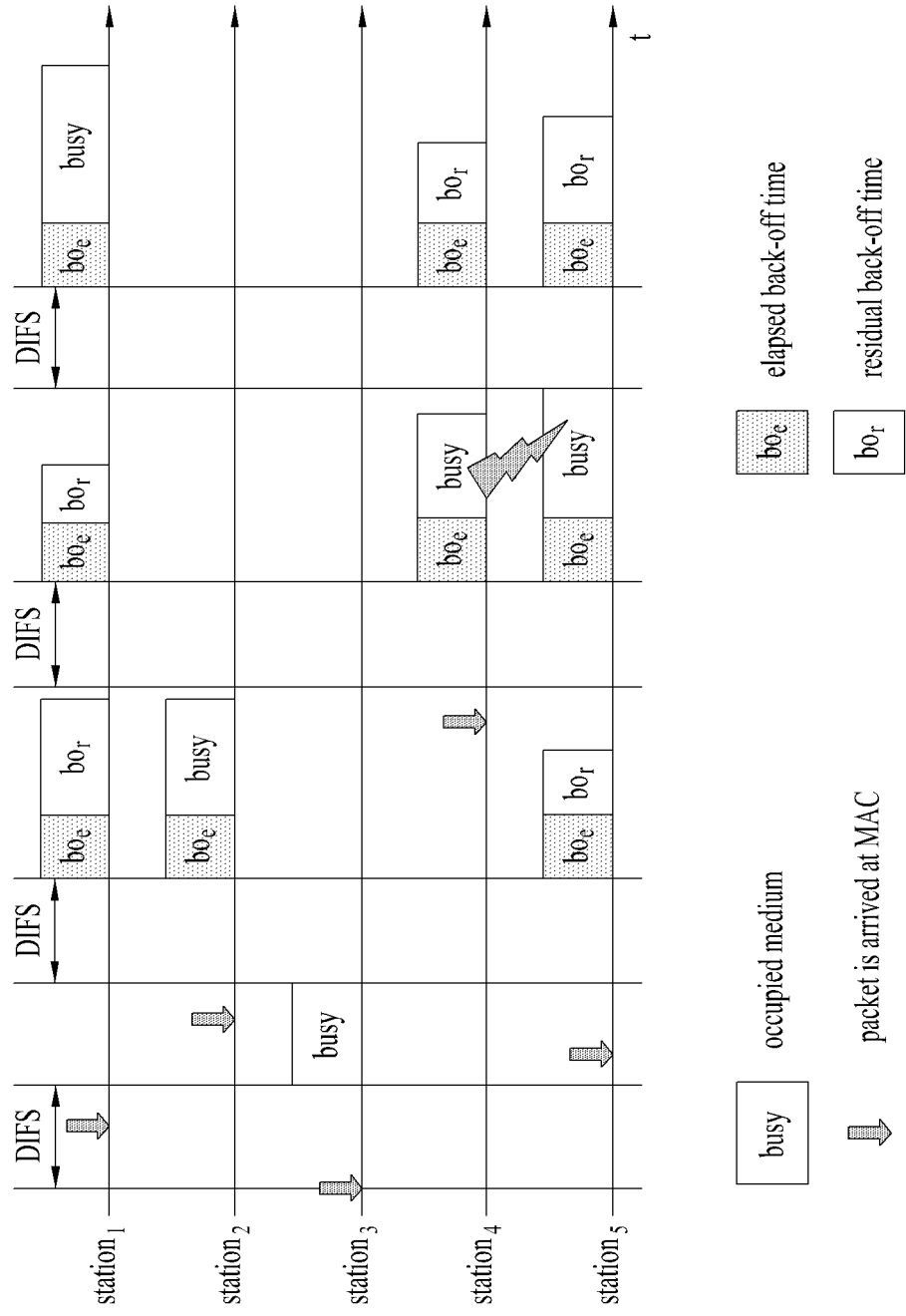
FIG. 6 is a diagram for explaining a back-off process.

FIG. 6 is a view referred to for describing a backoff procedure.

An operation based on a random backoff period will be described with reference to FIG. 6. If a medium transitions from an occupied or busy state to an idle state, a plurality of STAs may attempt to transmit data (or frames). To minimize collision, each STA may select a random backoff count, wait for as long a slot time period as the selected backoff count, and then attempt transmission. The random backoff count may be a pseudo-random integer and selected from a range of 0 to CW. CW is a contention window parameter. Although CWmin is initially set to CWmin, it may be doubled upon transmission failure (e.g. in the case where an ACK for a transmitted frame is not received). If CW reaches CWmax, the STAs may attempt data transmission using CWmax until the data transmission is successful. If the data transmission is successful, CW is reset to CWmin. Preferably, CW, CWmin, and CWmax may be set to $2^n-1$ (where n=0, 1, 2, ...).

When the random backoff procedure starts, the STA continuously monitors the medium while counting down backoff slots according to the determined backoff count. If the medium is monitored as occupied, the STA discontinues the count-down and waits. When the medium becomes idle, the STA resumes the count-down of the remaining backoff slots.

In the illustrated case of FIG. 6, if a transmission packet arrives at the MAC layer of STA3, STA3, may immediately transmit a frame, confirming that the medium is idle. In the meantime, the remaining STAs monitor the medium as busy and wait. While the remaining STAs wait, transmission data may be generated in each of STA1, STA2, and STA5. If each of STA1, STA2, and STA5 monitors the medium as idle, the STA may wait for a DIFS and then count down backoff slots according to its selected random backoff count. In FIG. 6, STA2 selects a smallest backoff count and STA1 selects a largest backoff count That is, at the moment STA2 finishes backoff counting and then starts to transmit a frame, the residual backoff time of STA5 is shorter than that of STA1. While STA is occupying the medium, STA1 and STA5 temporarily discontinue count-down and wait. If STA2 does not occupy the medium any longer and thus the medium becomes idle, STA1 and STA5 wait for a DIFS and resume the backoff counting. That is, after counting down as many remaining backoff slots as the remaining residual backoff time, each of STA1 and STA5 may start frame transmission. Since the residual backoff time of STA5 is shorter than that of STA1, STA5 starts frame transmission. While STA2 is occupying the medium, transmission data may also be generated in STA4. If the medium becomes idle, STA4 may wait for the DIFS, count down backoff slots according to its selected random backoff count, and then start frame transmission. In FIG. 6, the residual backoff time of STA5 happens to be equal to that of STA4. In this case, collision may occur between STA4 and STA5. When collision occurs, either STA4 or STA5 does not receive an ACK, resulting in data transmission failure. Then, STA4 and STA5 may double CW values, select random backoff counts, and then count down backoff slots. While the medium is occupied for transmission of STA and STA5, STA1 may wait. Then if the medium becomes idle, STA1 may wait for the DIFS and start frame transmission after its residual backoff time.

Sensing Operation of STA

As described before, the CSMA/CA mechanism includes virtual carrier sensing as well as physical carrier sensing in which an AP and/or an STA directly senses a medium. Virtual carrier sensing is performed to overcome problems that may be encountered with medium access, such as a hidden node problem. For virtual carrier sensing, the MAC layer of the WLAN system may use a Network Allocation Vector (NAV). An AP and/or an STA, which is currently using the medium or has authority to use the medium, indicates a time left until the medium is available to anther AP and/or another STA by a NAV. Accordingly, the NAV indicates a time period scheduled for the AP and/or the STA transmitting the frame to use the medium. Upon receipt of the NAV, an STA is not allowed to access the medium during the time period. The NAV may be set, for example, according to a value set in a "duration" field of a MAC header of a frame.

A robust collision detection mechanism has been introduced to reduce the probability of collision. This robust collision detection mechanism will be described with reference to FIGS. 7 and 8. While a carrier sensing range may be different from a transmission range in real implementation, it is assumed that the carrier sensing range and the transmission range are the same, for the convenience of description.

Figure 7:
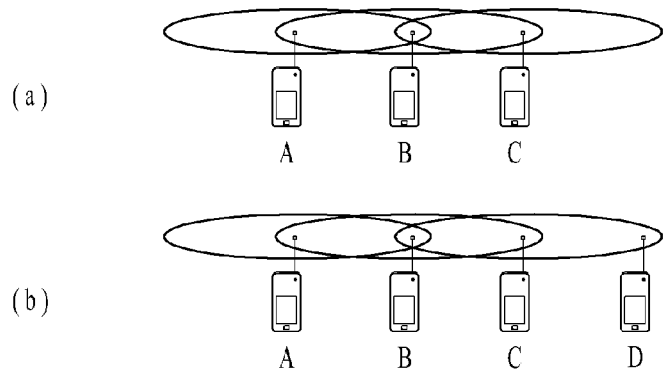
FIG. 7 is a diagram for explaining a hidden node and an exposed node.

FIG. 7 is a view referred to for describing hidden nodes and exposed nodes.

FIG. 7(a) illustrates an exemplary hidden node. In FIG. 7(a), STA A is communicating with STA B, and STA C has information to be transmitted. Specifically, STA C may determine that a medium is idle during carrier sensing before transmitting data to STA B, although STA A is transmitting information to STA B. This may occur because transmission of STA A (i.e. occupation of the medium) may not be detected at the location of STA C. As a result, STA B receives information from STA A and STA C simultaneously and thus collision occurs. Herein, STA A may be a hidden node to STA C.

FIG. 7(b) illustrates an exemplary exposed node. In FIG. 7(b), while STA B is transmitting data to STA A, STA C has information to be transmitted to STA D. If STA C performs carrier sensing, STA C may determine that a medium is occupied due to transmission of STA B. Therefore, although STA C has information to be transmitted to STA D, STA C should wait until the medium is idle since the medium is sensed as occupied. However, since STA A is actually located out of the transmission range of STA C, transmission from STA C may not collide with transmission from STA B from the viewpoint of STA A. Thus, STA C unnecessarily waits until STA B discontinues transmission. Herein, STA C may be an exposed node to STA B.

Figure 8:
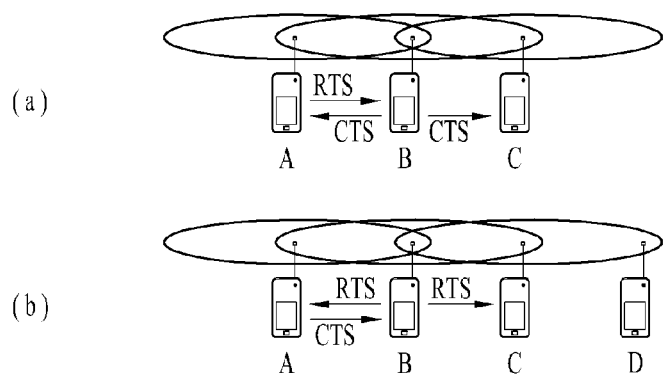
FIG. 8 is a diagram for explaining an RTS and a CTS.

FIG. 8 is a view referred to for describing Request To Send (RTS) and Clear To Send (CTS).

To efficiently utilize a collision avoidance mechanism in the exemplary situation of FIG. 7, short signaling packets such as RTS and CTS may be used. RTS/CTS between two STAs may be overheard by neighboring STA(s), so that the neighboring STA(s) may determine whether information is transmitted between the two STAs. For example, the receiving STA may indicate to its neighboring STAs that it will receive data by transmitting a CTS frame to the peripheral STAs when a transmitting STA transmits an RTS frame to a receiving STA.

FIG. 8(a) illustrates an exemplary method for solving the hidden node problem. In FIG. 8(a), it is assumed that both STA A and STA C are to transmit data to STA B. If STA A transmits an RTS frame to STA B, STA B transmits a CTS frame to its neighboring STAs, both STA A and STA C. As a consequence, STA C waits until STA A and STA B complete data transmission, thus avoiding collision.

FIG. 8(b) illustrates an exemplary method for solving an exposed node problem. STA C may overhear RTS/CTS transmission between STA A and STA B and thus may determine that no collision will occur although STA C transmits data to another STA (e.g. STA D). That is, STA B transmits an RTS frame to all neighboring STAs and only STA A having actual transmission data may transmit a CTS frame. Because STA C receives only the RTS frame without receiving the CTS frame from STA A, it may determine that STA A is located outside the carrier sensing range of STA C.

Power Management

As described before, an STA should perform channel sensing before transmission and reception in a WLAN system. Continuous channel sensing causes continuous power consumption of the STA. Considering that power consumption in a reception state is almost the same as power consumption in a transmission state, maintaining the reception state imposes a great load on a power-limited STA (i.e. an STA operated by a battery). Therefore, if the STA is kept in a reception standby state to continuously sense a channel, the STA inefficiently consumes power, without any special advantage in terms of WLAN throughput. In avert this problem, the WLAN system supports a Power Management (PW) mode for an STA.

The PM mode of the STA is classified into an active mode and a Power Save (PS) mode. The STA basically operates in the active mode. The STA operating in the active mode is kept awake. In the awake state, the STA may perform normal operations including frame transmission and reception, channel scanning, etc. On the other hand, the STA switches between a sleep state and an awake state in the PS mode. In the sleep state, the STA operates with minimum power, without performing frame transmission and reception and channel scanning As the STA operates longer in the sleep state, the STA consumes less power, thus lengthening an operation time. However, the STA may not stay in the sleep state unconditionally because it is impossible to transmit or receive a frame in the sleep state. In the presence of a frame to be transmitted to an AP, a sleep-state STA may switch to the awake state and then transmit the frame in the awake state. If the AP has a frame to be transmitted to the STA, the sleep-state STA is unable to receive the frame and does not know the presence of a frame to be received. Accordingly, the STA may need to switch to the awake state in every specific period to determine the presence or absence of a frame to receive (or to receive a frame in the presence of the frame to receive).

Figure 9:
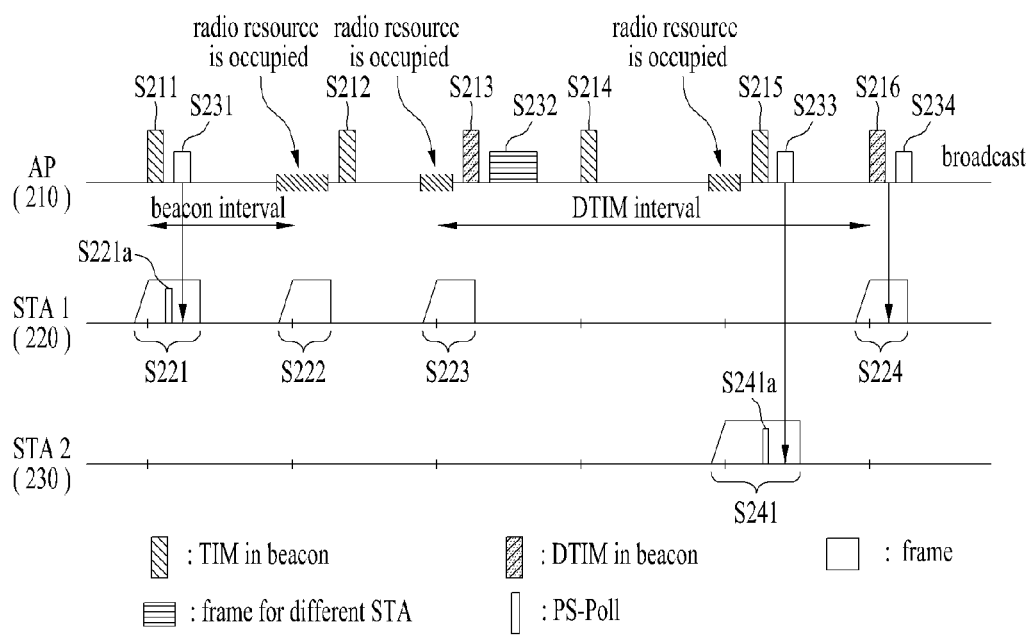
FIG. 9 is a flowchart for explaining a power management operation.

FIG. 9 is a view referred to for describing a power management operation.

Referring to FIG. 9, an AP 210 transmits a beacon frame to STAs within a BSS at every predetermined interval (S211, S212, S213, S214, S215, and S216). The beacon frame includes a TIM information element. The TIM information element includes information indicating that the AP 210 has buffered traffic for STAs associated with the AP 210 and will transmit frames to the STAs. The TIM information element includes a TIM indicating a unicast frame and a Delivery Traffic Indication Map (DTIM) indicating a multicast or broadcast frame.

The AP 210 may transmit a DTIM once every three beacon frame transmissions. Each of STA1 220 and STA2 222 operate in the PS mode. STA1 220 and STA2 222 may be configured to switch from the sleep state to the awake state at every wakeup interval of a predetermined period and to receive the TIM information element from the AP 210. Each STA may calculate a switching time at which it will switch to the awake state based on its own local clock. In FIG. 9, it is assumed that the STAs have the same clock as the AP.

For example, the predetermined wakeup interval may be set in such a manner that STA1 220 may switch to the awake state in each beacon interval to receive the TIM element. Accordingly, when the AP 210 first transmits the beacon frame (S211), STA1 220 may switch to the awake state (S212). STA1 220 may receive the beacon frame and acquire the TIM information element from the beacon frame. If the TIM information element indicates the presence of a frame to be transmitted to STA1 220, STA1 220 may transmit to the AP 210a a Power Save-Poll (PS-Poll) frame requesting transmission of the frame (S221a). The AP 210 may transmit the frame to STA1 220 in response to the PS-Poll frame (S231). Upon complete receipt of the frame, STA1 220 returns to the sleep state.

When the AP 210 transmits the beacon frame at a second time, another device accesses the medium and thus the medium is busy. Therefore, the AP 210 may not transmit the beacon frame at the accurate beacon interval. Instead, the AP 210 may transmit the beacon frame at a delayed time (S212). In this case, although STA1 220 switches to the awake state at the beacon interval, STA1 fails to receive the delayed beacon frame and thus returns to the sleep state (S222).

When the AP 210 transmits the beacon frame at a third time, the beacon frame may include a TIM information element configured as a DTIM. However, since the medium is busy, the AP 210 transmits the beacon frame at a delayed time (S213). STA1 220 may switch to the awake state at the beacon interval and acquire the DTIM from the beacon frame received from the AP 210. It is assumed that the DTIM indicates the absence of a frame to be transmitted to STA1 220 and the presence of a frame to be transmitted to another STA. Then, STA1 220 may return to the sleep state, determining that there is no frame to be received. After transmitting the beacon frame, the AP 210 transmits the frame to the corresponding STA (S232).

The AP 210 transmits the beacon frame at a fourth time (S214). However, since STA1 220 has not acquired information indicating the presence of traffic buffered for STA1 220 from the previous twice-received TIM information element, STA1 220 may adjust the wakeup interval to receive the TIM information element. Or if a beacon frame transmitted by the AP 210 includes signaling information for adjusting the wakeup interval of STA1 220, the wakeup interval of the STA1 220 may be adjusted. In this example, STA1 220 may be configured to change its operation state from one wake-up in every beacon interval to one wake-up in every 3 beacon intervals, in order to receive a TIM information element. Therefore, when the AP 210 transmits a fourth beacon frame (S214) and transmits a fifth beacon frame (S215), STA1 220 is kept in the sleep state and thus may not acquire a corresponding TIM information element.

When the AP 210 transmits the beacon frame at a sixth time (S216), STA1 220 may switch to the awake state and acquire a TIM information element from the beacon frame (S224). The TIM information element is a DTIM indicating the presence of a broadcast frame. Accordingly, STA1 220 may receive the broadcast frame from the AP 210 without transmitting a PS-Poll frame to the AP 210 (S234). In the meantime, a wakeup interval configured for STA2 230 may be set to be longer than the wakeup interval of STA1 220. Thus, when the AP 210 transmits the beacon frame at the fifth time (S215), STA2 230 may enter the awake state and receive the TIM information element (S241). STA2 230 may determine the presence of a frame to receive by the TIM information element and transmit a PS-Poll frame to the AP 210 to request frame transmission (S241a). The AP 210 may transmit the frame to STA2 230 in response to the PS-Poll frame (S233).

To implement the PS mode as illustrated in FIG. 9, a TIM information element includes either a TIM indicating the presence or absence of a frame to be transmitted to an STA or a DTIM indicating the presence or absence of a broadcast/multicast frame. The DTIM may be configured by setting a field in the TIM information element.

Figure 10:
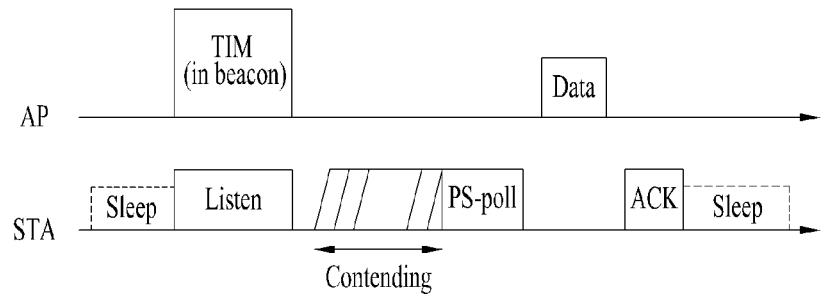
FIGS. 10 to 12 are diagrams for explaining an operation of an STA, which has received a TIM, in detail.
Figure 11:
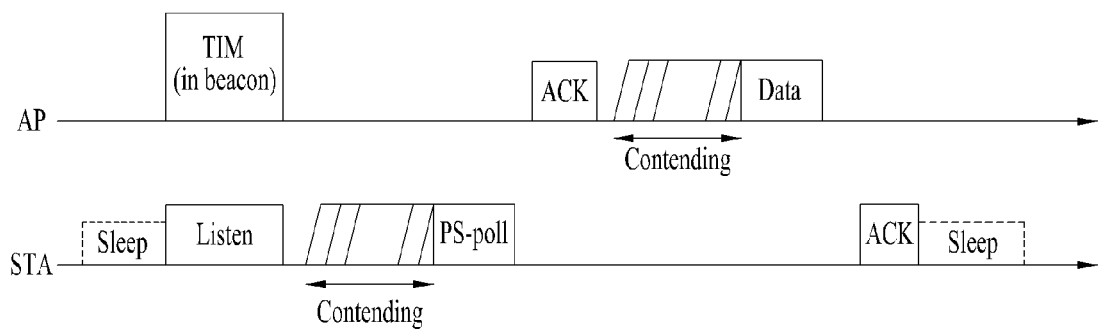
Figure 12:
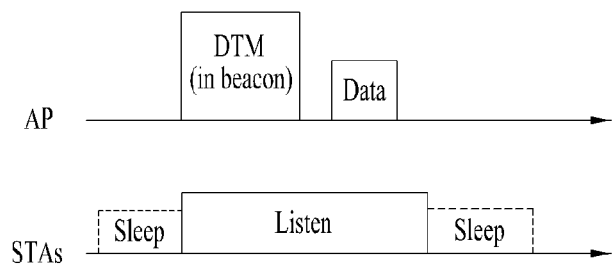

FIGS. 10, 11, and 12 are views referred to for describing an operation of an STA that has received a TIM in detail.

Referring to FIG. 10, an STA switches from a sleep state to an awake state to receive a beacon frame including a TIM element from an AP. The STA may determine the presence of buffered traffic directed to the STA by interpreting the received TIM element. After contending with other STAs to access a medium for transmission of a PS-Poll frame, the STA may transmit a PS-Poll frame requesting data frame transmission to the AP. Upon receipt of the PS-Poll frame from the STA, the AP may transmit the frame to the STA. The STA may receive a data frame and then transmit an ACKnowledgment (ACK) frame to the AP in response to the received data frame. Subsequently, the STA may return to the sleep state.

As illustrated in FIG. 10, the AP may receive the PS-Poll frame from the STA and transmits the data frame after a predetermined time (e.g. a Short InterFrame Space (SIFS)) according to an immediate response scheme. If the AP does not prepare a data frame to be transmitted to the STA during the SIFS after receiving the PS-Poll frame, the AP may operate according to a deferred response scheme, which will be described with reference to FIG. 11.

As in the example of FIG. 10, an STA switches from a sleep state to an awake state, receives a TIM from an AP, and transmits a PS-Poll frame to the AP through contention in the illustrated case of FIG. 11. If the AP does not prepare a data frame during an SIFS after receiving the PS-Poll frame, the AP may transmit an ACK frame to the STA, instead of the data frame. If the AP prepares the data frame after transmitting the ACK frame, the AP may transmit the data frame to the STA after contention. The STA may transmit, to the AP, an ACK frame indicating that the data frame has been received successfully and may switch to the sleep state.

FIG. 12 illustrates an exemplary case in which an AP transmits a DTIM. STAs may switch from the sleep state to the awake state to receive a beacon frame including a DTIM element from the AP. The STAs may determine from the received DTIM that a multicast/broadcast frame will be transmitted to them. After transmitting the beacon frame including the DTIM, the AP may directly transmit data (i.e. the multicast/broadcast frame) without receiving a PS-Poll frame. The STAs receives the data in the awake state in which they are kept after receiving the beacon frame including the DTIM. Upon complete receipt of the data, the STAs may return to the sleep state.

TIM Structure

In the PS-mode operation method based on the TIM (or DTIM) protocol described above with reference to FIGS. 9 to 12, an STA may determine whether there is a data frame to be transmitted to the STA by STA identification information included in a TIM element. The STA identification information may be information related to an AID which is allocated to an STA when the STA is associated with an AP.

An AID is used as a unique ID of each STA within one BSS. For example, the AID may be one of 1 to 2007 in the current WLAN system. In the currently defined WLAN system, 14 bits may be allocated to an AID in a frame transmitted by an AP and/or an STA. Although the AID value may be assigned up to 16383, the values of 2008 to 16383 are reserved.

An already defined TIM element is not suitable for M2M applications through which many STAs (for example, more than 2007 STAs) may be associated with one AP. If the conventional TIM structure is extended without any change, a TIM bitmap gets too large in size. As a consequence, the extended TIM structure may not be supported using a legacy frame format and is inappropriate for M2M communication for which low-rate applications are considered. In addition, it is expected that a very small number of STAs are supposed to receive a data frame during one beacon interval. Therefore, considering the afore-mentioned M2M communication application examples, it is expected that the size of a TIM bitmap will be increased but most bits of the TIM bitmap are set to zero (0) in many cases. In this context, there is a need for a method for efficiently compressing a bitmap.

Conventionally, successive zeroes at the start of a bitmap are omitted and represented by an offset (or a starting point) in order to compress the bitmap. However, if there are buffered frames for a small number of STAs but the AID values of the STAs are highly different from one another, compression efficiency is not high. For example, if buffered frames are destined for only two STAs having AIDs of 10 and 2000, respectively, the resulting compressed bitmap is of length 1990 and has all zeros except for non-zeroes at both ends. If a small number of STAs can be associated with one AP, inefficiency of bitmap compression does not matter much. On the contrary, if the number of STAs associable with one AP increases, such inefficiency may degrade overall system performance.

Figure 13:
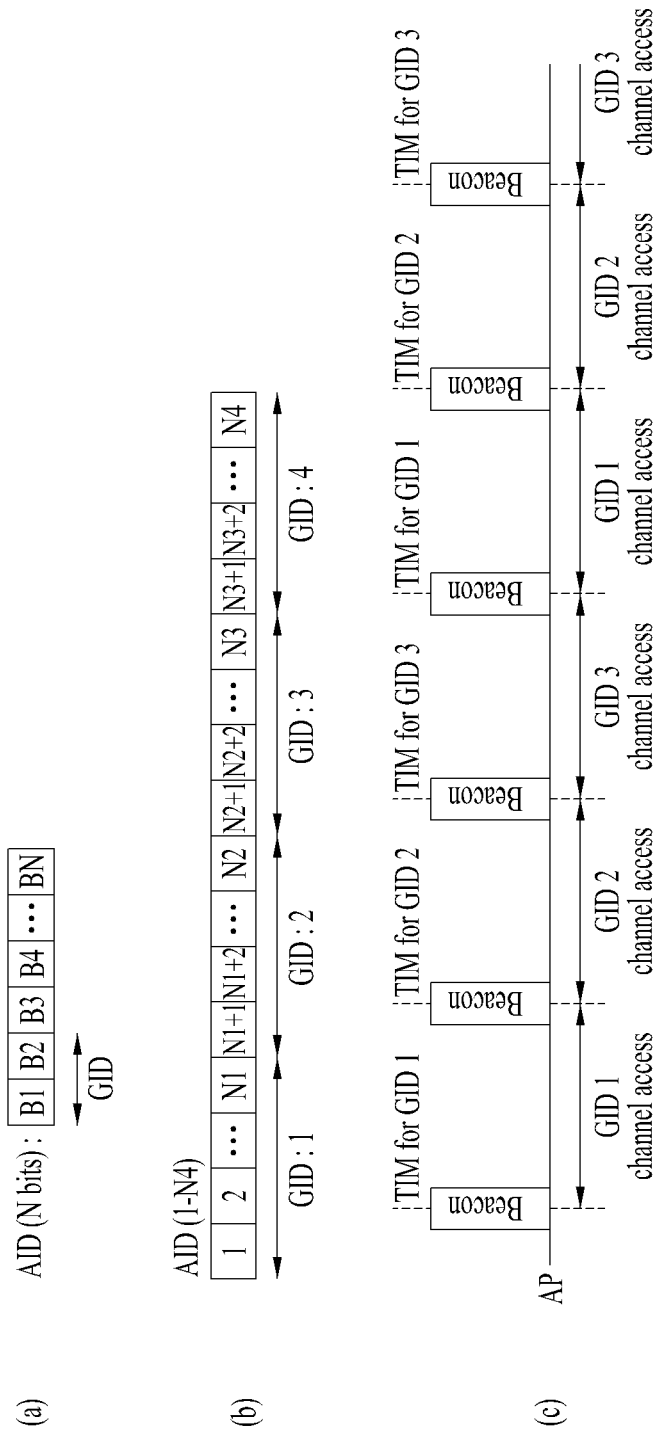
FIG. 13 is a diagram for explaining a group-based AID.

To overcome the problem, AIDs may be divided into a plurality of groups, for more effective data transmission. A predetermined Group ID (GID) is allocated to each group. AIDs allocated on a group basis will be described below with reference to FIG. 13.

FIG. 13(a) illustrates an example of AIDs allocated on a group basis. In FIG. 13(a), a few first bits of an AID bitmap may be used to indicate a GID. For example, 4 GIDs may be represented in the first 2 bits of the AID bitmap. If the AID bitmap includes N bits in total, the first 2 bits (B1 and B2) may represent the GID of the AIDs.

FIG. 13(a) illustrates another example of AIDs allocated on a group basis. In FIG. 13(b), GIDs may be allocated according to the positions of the AIDs. In this case, AIDs having the same GID may be represented by an offset and a length. For example, if GID 1 is represented by offset A and length B, this means that AIDs ranging from A to A+B−1 in a bitmap have GID 1. For example, it is assumed in FIG. 13(b) that AIDs ranging from 1 to N4, are divided into four groups. In this case, AIDs belonging to GID 1 are 1 to N1 and thus may be represented by offset 1 and length N1. AIDs belonging to GID 2 may be represented by offset N1+1 and length N2−N1+1, AIDs belonging to GID 3 may be represented by offset N2+1 and length N3−N2+1, and AIDs belonging to GID 4 may be represented by offset N3+1 and length N4−N3+1.

As this group-based AID allocation enables channel access during different time periods according to GIDs, lack of TIM elements for a large number of STAs may be overcome and data may be transmitted and received efficiently, as well. For example, channel access is available only to an STA(s) of a specific group, while channel access may be restricted for the other STA(s), during a specific time period. The specific time period during which channel access is available only to the STA(s) of the specific group may be called a Restricted Access Window (RAW).

With reference to FIG. 13(c), GID-based channel access will be described below. FIG. 13(c) illustrates an exemplary channel access mechanism based on beacon intervals, when AIDs are divided into three groups. A first beacon interval (or a first RAW) is a time period during which channel access is allowed for STAs having the AIDs of GID 1 and denied for the STAs belonging to the other GIDs. To implement this mechanism, a TIM element only for the AIDs of GID 1 is included in a first beacon. A TIM element only for the AIDs of GID 2 is included in a second beacon frame. Accordingly, channel access is allowed only for STAs having the AIDs of GID 2 during a second beacon interval (or a second RAW). A TIM element only for the AIDs of GID 3 is included in a third beacon frame, so that channel access may be allowed only for STAs having the AIDs of GID 3 during a third beacon interval (or a third RAW). A TIM element only for the AIDs of GID 1 is included in a fourth beacon frame, so that channel access may be allowed only for the STAs having the AIDs of GID 1 during a fourth beacon interval (or a fourth RAW). In the same manner, channel access may be allowed only for the STAs of a specific group indicated by a TIM included in a corresponding beacon frame during each of beacon intervals following the fifth beacon interval (or during each of RAWs following the fifth RAW).

While the order of allowed GIDs is cyclic or periodic according to the beacon intervals in FIG. 13(c), this should not be construed as limiting the present invention. That is, as only an AID(s) having a specific GID(s) may be included in a TIM element, channel access may be allowed only for an STA(s) having the specific AID(s) and denied for the remaining STA(s), during a specific time interval (e.g. a specific RAW).

The above group-based AID allocation scheme may be referred to as a hierarchical TIM structure. That is, a total AID space is divided into a plurality of blocks and channel access is allowed only for an STA(s) (i.e. an STA(s) of a specific group) corresponding to a specific block(s) having non-zero values. Therefore, since a large-sized TIM is divided into small-sized blocks/groups, an STA may easily maintain TIM information and the blocks/groups may be easily managed according to the class, QoS, or usage of the STA. Although FIG. 13 exemplarily illustrates a 2-level layer, a hierarchical TIM structure with two or more levels may be configured. For example, a total AID space may be divided into a plurality of page groups, each page group may be divided into a plurality of blocks, and each block may be divided into a plurality of sub-blocks. Then, the example of FIG. 13(a) may be extended in such a manner that first N1 bits of an AID bitmap represent a Page ID (i.e. PID), the next N2 bits represent a block ID, the next N3 bits represent a sub-block ID, and the remaining bits represent the position of STA bits included in a sub-block.

In the following examples of the present invention, STAs (or AIDs allocated to the respective STAs) may be divided into predetermined hierarchical groups and managed in various manners. However, the group-based AID allocation scheme is not limited to the specific examples.

Improved Channel Access Scheme

In the case where AIDs are allocated/managed on a group basis, STAs belonging to a specific group may access a channel only during a "group channel access interval" (or RAW) allocated to the group. If an STA supports an M2M application, traffic may be generated for the STA over a long period (e.g., tens of minutes or a few hours). Because the STA does not need to frequently maintain an awake state, it is preferred that the STA operates in a sleep state and switches to the awake state from time to time (i.e., a long wakeup interval is set for the STA). Such an STA having a long wakeup interval may be referred to as a "long sleeper" or an STA operating in a "long sleep" mode. Setting of a long wakeup interval is not limited to M2M communication. In a general WLAN operation, a long wakeup interval may be set according to the state of an STA or under circumstances.

Once a wakeup interval is set, an STA may determine whether the wakeup interval has elapsed based on its local clock. Since the local clock of the STA generally uses a low-price oscillator, the local clock may have a high error probability. If the STA operates in the long sleep mode, errors may become serious over time. As a result, the time synchronization of the STA that wakes up from time to time may not coincide with that of an AP. For example, although the STA calculates a timing at which it may receive a beacon frame and switches to the awake state based on the calculated timing, the STA may fail to receive an actual beacon from the AP at the timing That is, the STA may miss a beacon frame due to clock drift and the beacon loss may occur more often when the STA operates in the long sleep mode.

Figure 14:
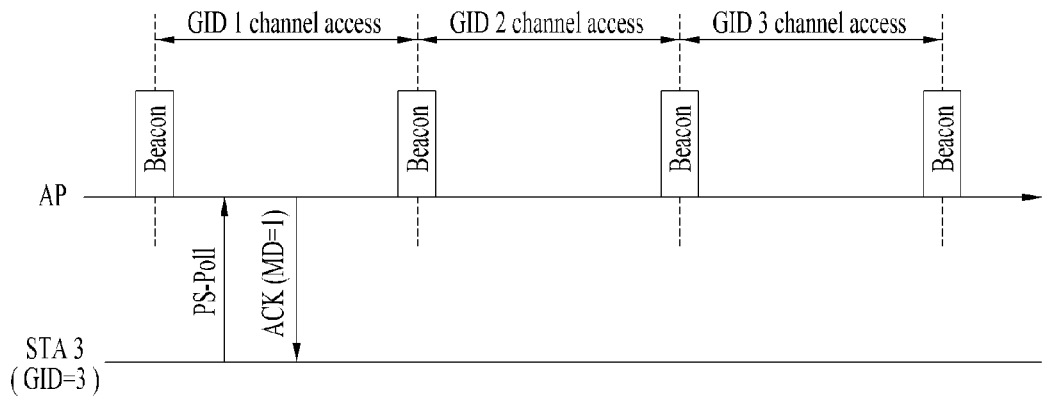
FIGS. 14 to 16 are diagrams for examples of an STA operation in case that a group channel access interval is configured.
Figure 15:
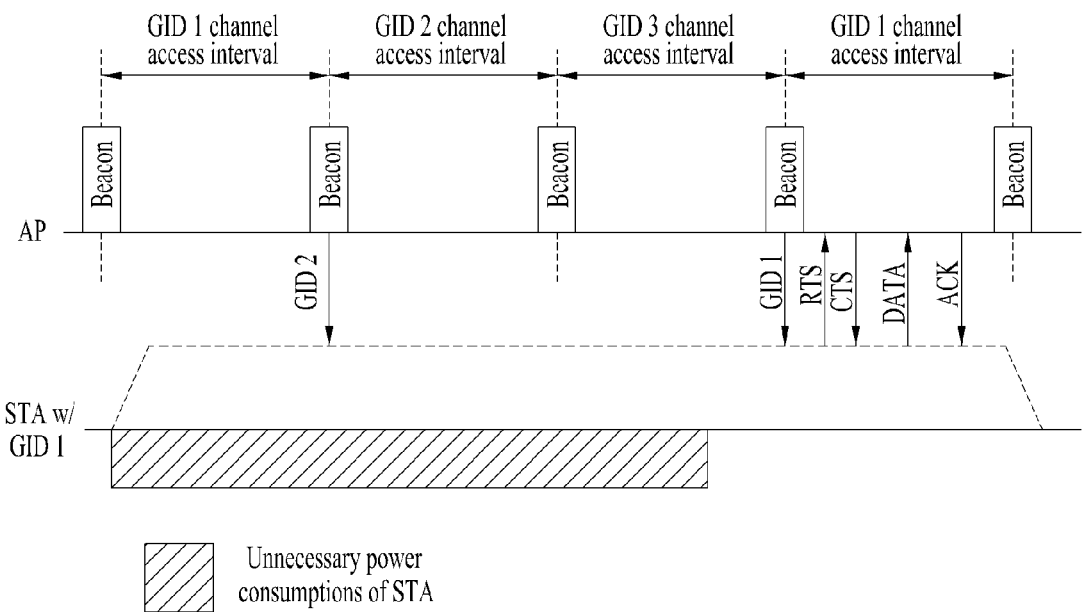
Figure 16:
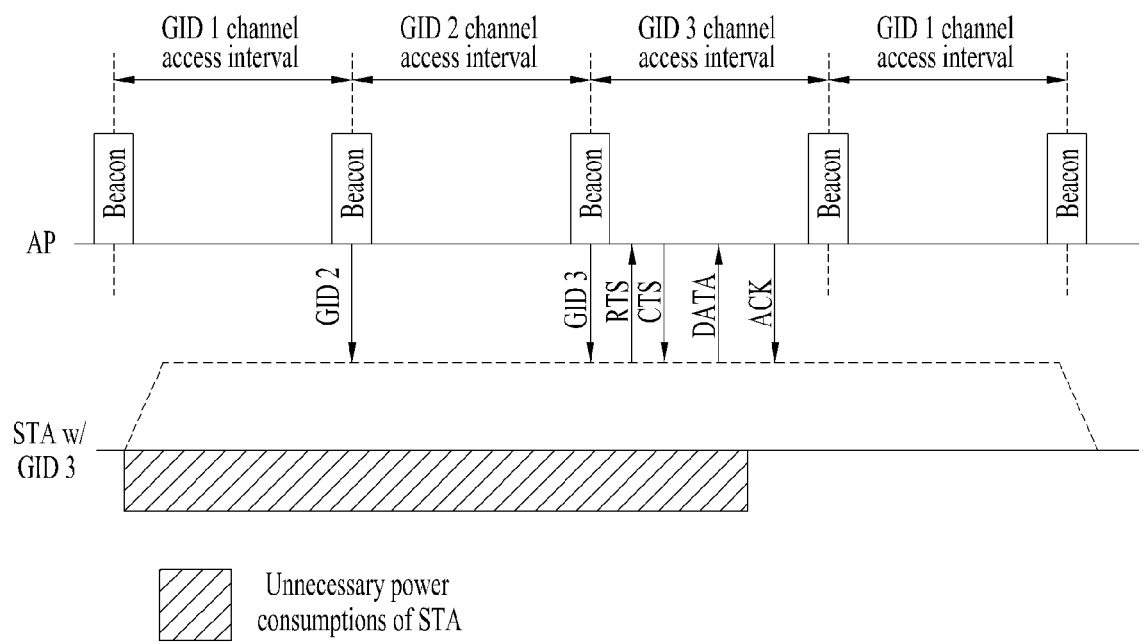

FIGS. 14, 15, and 16 illustrate exemplary operations of an STA, when group channel access intervals are set.

Referring to FIG. 14, STA3 belongs to group 3 (i.e. GID=3). STA3 may wake up in a channel access interval allocated to group 1, (i.e. GID=1) and transmit a PS-Poll frame to an AP, requesting frame transmission from the AP to STA3. Upon receipt of the PS-Poll frame from STA3, the AP transmits an ACK frame to STA3. In the presence of buffered data to be transmitted to STA3, the AP may provide information indicating it (i.e., the presence of buffered data to be transmitted to STA3) to STA3 by the ACK fame. For example, the information may be indicated by setting a 1-bit "More Data (MD)" field to 1 (i.e., MD=1) in the ACK frame.

Since STA3 transmits the PS-Poll frame at a time point within a channel access interval of group 1, even though the AP has data to be transmitted to STA3, the AP does not transmit the data immediately to STA3. Instead, the AP transmits the data to STA3 in a channel access interval allocated to group 3 (GID 3 channel access in FIG. 14).

STA3 awaits reception of the data from the AP because it has received the ACK frame with MD=1 from the AP. That is, since STA3 has not received a beacon frame shortly after waking up, STA3 transmits the PS-Poll frame to the AP, assuming that STA3 may have woken up in the channel access interval allocated to the group of STA3 and the AP may have data to be transmitted to STA3. Or STA3 may transmit the PS-Poll frame to the AP to receive data that might be destined for STA3, assuming that time is not synchronized due to its long-sleep mode operation. As the ACK frame received from the AP indicates the presence of data for STA3, STA3 awaits reception of the data, on the assumption that a current channel access interval is the channel access interval available to STA3. Even though data reception is not allowed for STA3, STA3 unnecessarily consumes power until time synchronization is acquired based on information included in a next beacon frame.

Especially when STA3 operates in the long sleep mode, STA3 does not receive a beacon frame often. Therefore, STA3 may consume power unnecessarily, for example, by performing CCA even though the current channel access interval is not for STA3.

FIG. 15 illustrates a case where an STA having GID 1 (i.e. belonging to group 1) misses a beacon frame at its wake-up timing. As the STA fails to receive a beacon frame with the GID (or PID) allocated to the STA, the STA waits in the awake state until receiving a beacon frame with its GID (or PID). That is, even though the STA wakes up in a channel access interval allocated to the STA, the STA does not know whether the wake-up timing falls into the channel access interval allocated to its group because it has not checked whether a TIM included in a beacon frame includes its GID (or PID).

As described above, the STA, which has switched from the sleep state to the awake state, is kept in the awake state until receiving a fourth beacon frame with its GID (i.e. GID 1) after missing a first beacon frame, thereby consuming power unnecessarily. After the unnecessary power consumption, the STA may eventually receive a beacon frame including GID 1 and may thus perform RTS transmission, CTS reception, data frame transmission, and ACK reception based on the received beacon frame.

FIG. 16 illustrates a case where an STA wakes up in a channel access interval allocated to another group. For example, an STA with GID 3 may wake up in a channel access interval for GID 1. That is, after waking up, the STA with GID 3 waits until receiving a beacon frame including its GID, consuming power unnecessarily. Upon receipt of a TIM indicating GID 3 in a third beacon frame, the STA may recognize a channel access interval allocated to its group and perform data transmission and ACK reception by RTS- and CTS-based CCA.

Session Recovery

In the following, session recovery in IEEE 802.11 system is described. The session recovery may be comprehended as doing an authentication procedure and an association procedure again by AP restart and the like. The AP restart may be performed due to both a planned element such as network management, software update and the like and an unexpected element such as unexpected power failure, power loss due to back-up battery excess and the like. When an AP is restarted, such association attributes as a TSF (timing synchronization function) timer, AID, session encryption keys and the like are not valid anymore. Hence, when the AP is restarted, it is necessary for an STA to perform re-association and re-authentication with the AP via a session recovery procedure.

Whether an AP is restarted may be checked by the TSF timer. For instance, if a timestamp value stored in an STA is different from a TSF timer value of an AP, the STA may determine it as the AP is restarted. Yet, the aforementioned method means that STAs associated with the AP should individually perform re-association/re-authentication before the AP is restarted, it may be inefficient. For instance, when 6000 STAs are associated with a single AP, if all APs perform a re-association/re-authentication procedure, it is inefficient in terms of a resource, STA power consumption, overhead and the like. When a user equipment operating in a PS mode is switched to an awake state to receive a beacon, the user equipment may be awaked on wrong timing due to restart of an AP and power consumption of the user equipment may be considerable since the user equipment should wait until beacon reception is completed. When an AP is restarted, in case of a non-TIM STA, which does not receive a beacon frame, the non-TIM STA is not able to know whether the AP is restarted. Hence, the AP is unable to properly receive an uplink frame transmitted by the non-TIM STA. In particular, the non-TIM STA, which does not perform re-association since the non-TIM STA does not know whether the AP is restarted, transmits an uplink frame (e.g., a PS-Poll frame, a trigger frame, an uplink data frame and the like) using timing related to the AP before the restart. In this case, since the AP has timing different from the timing of the non-TIM STA or the AP does not have AID of the STA transmitted the uplink frame, it is difficult for the AP to receive the uplink frame transmitted by the non-TIM STA. And, since the AP does not have associated attributes for an STA, the AP is unable to transmit data to the STA. In the following description, in case that an AP is restarted, a method for a non-TIM STA to perform session recovery is explained. In the following description, the AP is able to store AID, a MAC address and the like of STAs associated with the AP before the AP is restarted. When the AP receives an uplink frame from an STA, the AP is able to know whether the STA performs re-association or session recovery.

Session Recovery of Non-TIM STA

Figure 17:
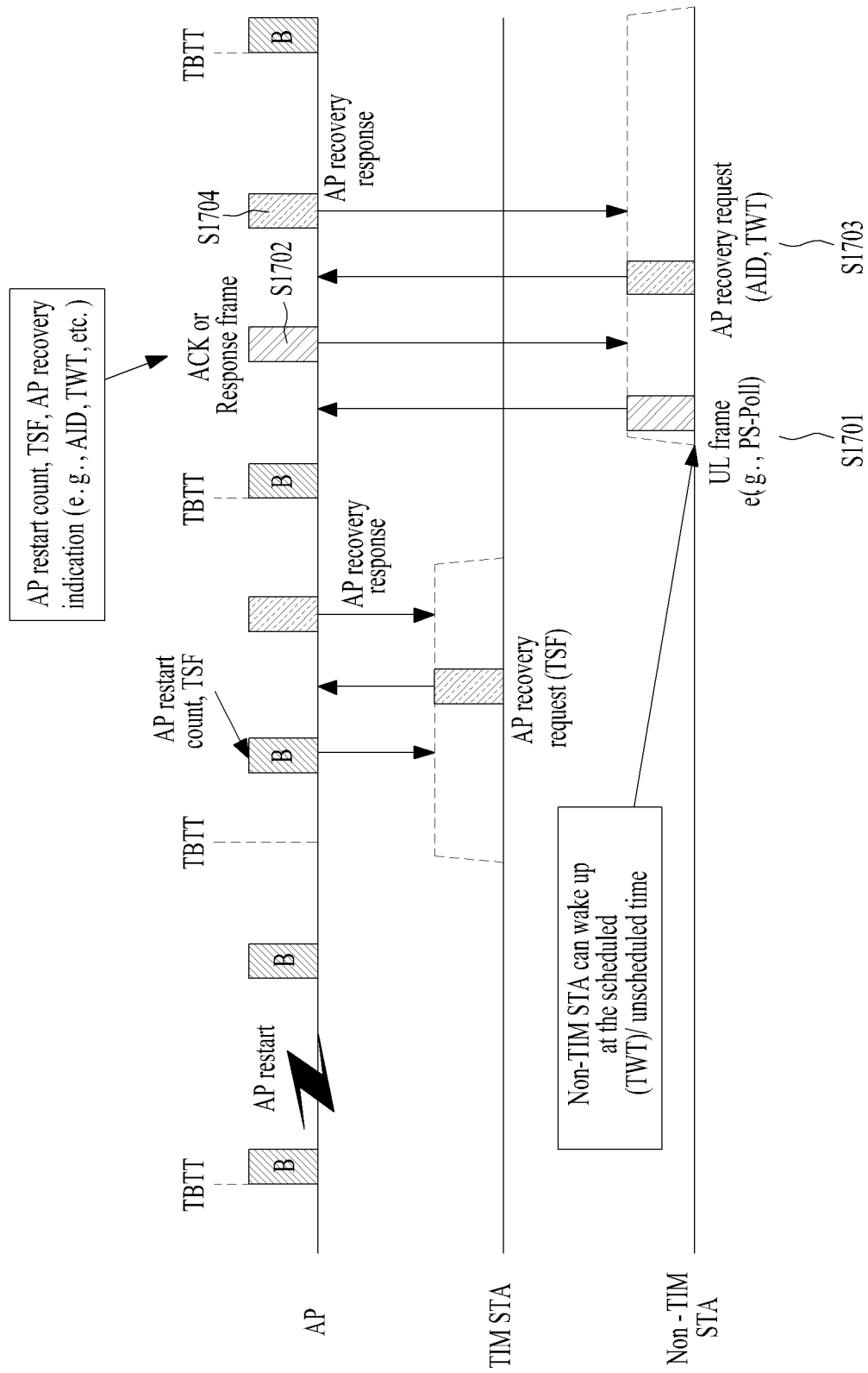
FIGS. 17 to 21 are diagrams for transmitting/receiving an uplink/downlink frame and performing STA re-association when an AP is restarted according to embodiment of the present invention.

FIG. 17 shows a session recovery process of a non-TIM STA according to one embodiment of the present invention.

Referring to FIG. 17, a non-TIM STA wakes up at a time scheduled by a TWT and the like or a time not scheduled (e.g., a random time in a listen interval and the like) and may transmit an uplink frame [S1701]. In this case, the uplink frame may correspond to a PS-poll frame, a trigger frame, an uplink data frame or the like.

The non-TIM STA may receive a response frame (e.g., an ACK frame, an NDP ACK frame, a downlink data frame, a response frame and the like) in response to the uplink frame [S1702]. The response frame includes an AP restart count. In this case, the AP restart count increases whenever an AP is restarted. The AP restart count may be transmitted via a beacon frame. The non-TIM STA compares the AP restart count with an AP restart count stored in the non-TIM STA. If the AP restart count is greater than the AP restart count stored in the non-TIM STA, the non-TIM STA may determine it as an AP is restarted. In particular, the non-TIM STA may check that an AP is restarted via the response frame.

And, the AP may include a TSF (time stamp field) and AP recovery indication in the response frame. The AP recovery indication may include AID, TWT, TSF, MAC header information and the like. In this case, the AP recovery indication indicates the non-TIM STA to transmit an information element included in the recovery indication, i.e., the AID, the TWT, the TSF, the MAC header information and the like. In other word, the information element included in the AP recovery indication is used for updating the information element. For instance, if a TSF is included in the AP recovery indication, the non-TIM STA, which has received the TSF, may transmit a TSF of the non-TIM STA to the AP (via an AP recovery request and the like described later). Having received the TSF of the non-TIM STA, the AP may update a timer based on the TSF. In this case, since it is not necessary for many non-TIM STAs to update a TSF timer, impact on a system due to AP restart may be minimized and it may prevent non-TIM STAs from being awakened on a wrong timing.

Subsequently, when it is determined that the AP is restarted (via an AP restart count greater than an AP restart count stored in the non-TIM STA, a small time stamp or the like), the non-TIM STA may perform a re-association/re-authentication procedure with the AP. The re-association procedure may be performed by such a procedure as AP recovery request/response frame exchange, association request/response frame exchange, re-association request/response and the like. FIG. 17 shows AP recovery request/response.

The non-TIM STA may transmit an AP recovery request frame to the AP [S1703]. In this case, the AP recovery request frame may include information elements (AID, TWT, TSF, MAC header information and the like) corresponding o the AP recovery indication. For instance, if the AID and the TWT are included/indicated in the AP recovery indication, the non-TIM STA may transmit the AP recovery request frame in a manner of including AID and TWT, which are assigned before the AP is restarted, in the AP recovery request frame.

Having received the AP recovery request from the non-TIM STA, the AP may transmit an AP recovery response frame in response to the AP recovery request [S1704].

Figure 18:
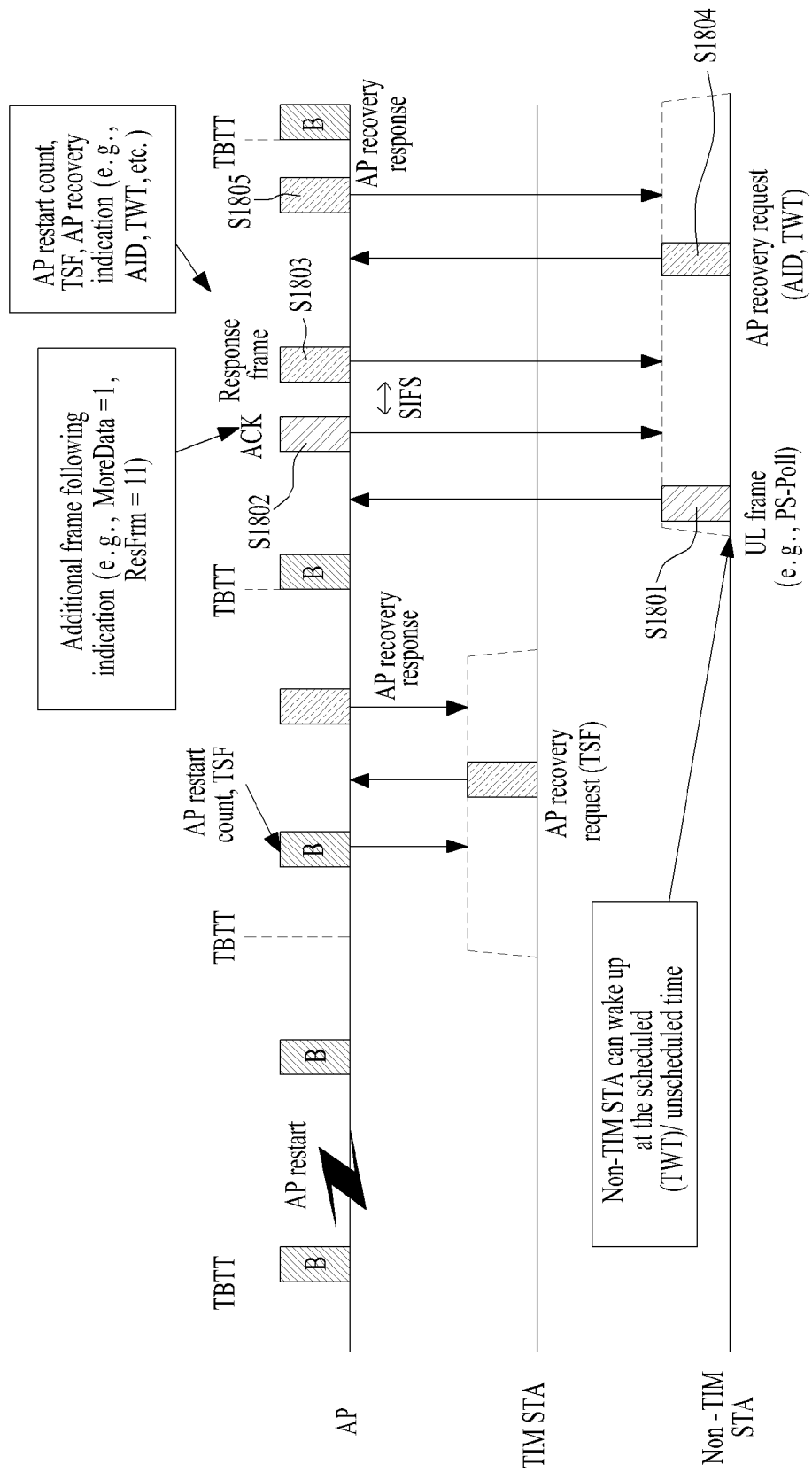

In the aforementioned description, the non-TIM STA may receive an ACK frame indicating (e.g., additional frame indication) that a response frame will be transmitted before the response frame is received. FIG. 18 shows an example of the aforementioned case.

Referring to FIG. 18, the non-TIM STA transmits an uplink frame to the AP [S1801] and may receive an ACK frame in response to the uplink frame [S1802]. In this case, an additional frame indication indicating that an additional frame is to be transmitted may be included in the ACK frame. An additional frame indicator of the additional frame indication may be replaced by setting a More Data field of an MAC header to 1 and setting a response frame of SIG or an ACK indication field to 11. In particular, when the non-TIM STA transmits PS-poll, if a More Data field of the PS-poll is set to 0, a More Data field of the received ACK frame is set to 1 and a response frame (ResFrm) is set to 1, the non-TIM STA may determine it as there exists an additionally transmitted frame after the ACK. Or, an additionally transmitted frame may be indicated by setting a More flag field value of an ACK frame to 1 or setting a Retry field value to 1.

After SIFS, the AP transmits a response frame to the non-TIM STA [S1803], receives an AP recovery request frame from the non-TIM STA and transmits an AP recovery response frame to the non-TIM STA. Detail explanation on this is substituted by explanation on FIG. 17 mentioned earlier. It may be comprehended as contents mentioned earlier in FIG. 17 may be basically applied to explanation on FIG. 18 and FIGS. 19 to 21 in the following except an item specifically mentioned. For instance, in the following explanation, when it is simply explained as AP recovery indication is included, unless there is a special mention on information elements included in the AP recovery indication, as mentioned earlier in FIG. 17, it may be comprehended as the AP recovery indication includes AID, TWT, TSF, MAC header information and the like.

Figure 19:
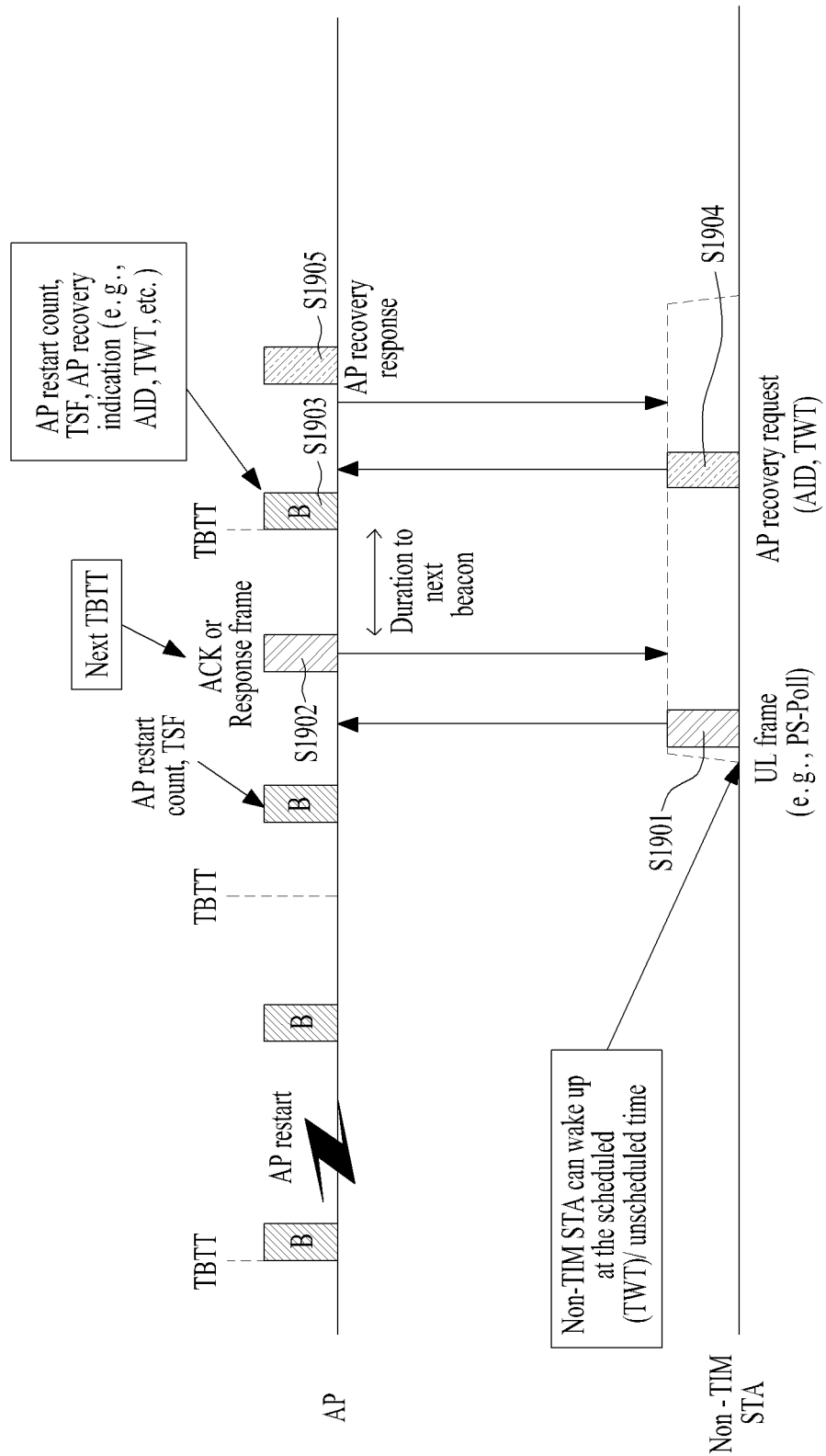

In the foregoing description mentioned earlier in FIG. 17 to FIG. 18, although it is explained as the AP recovery information is transmitted to the non-TIM STA via a response frame or the like, the AP recovery information may also be transmitted via a beacon frame. Referring to FIG. 19, the non-TIM STA transmits an uplink frame [S1901] and receives an ACK or a response frame [S1902]. The ACK or the response frame can include a next beacon transmission timing (e.g., Next TBTT or Duration to next beacon). The non-TIM STA receives a beacon on the next beacon transmission timing [S1903]. The beacon may include information related to AP recovery (e.g., AP restart count, TSF, AP recovery indication and the like). The non-TIM STA updates the information related to the AP recovery and may be then able to perform an AP recovery request/response procedure [S1904], [S1905].

Figure 20:
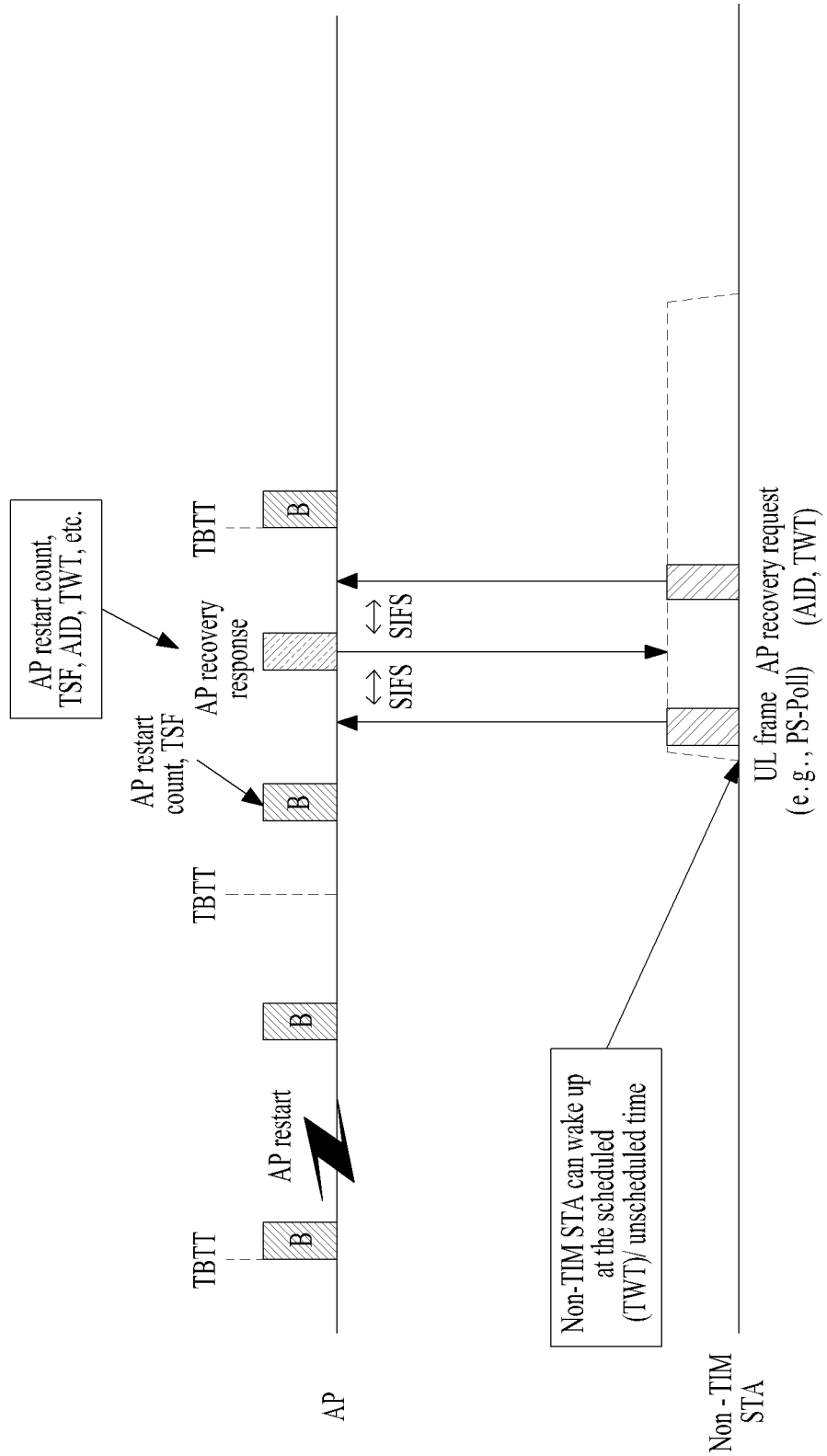

FIG. 20 shows an example of a case that the AP receives an uplink frame from the non-TIM STA and immediately transmits an AP recovery response frame to the non-TIM STA in response to the uplink frame. If the AP recovery response frame is immediately transmitted, since session recovery time of the non-TIM STA is reduced, power consumption of the non-TIM STA may be more reduced.

Referring to FIG. 20, the AP may reassign AID and TWT to the non-TIM STA via the AP recovery response frame. After the AP recovery response frame is received, the non-TIM STA may transmit an ACK frame or an AP recovery response frame. In this case, the AP recovery response frame may include BSS-specified information such as AP restart count, TSF and the like.

Figure 21:
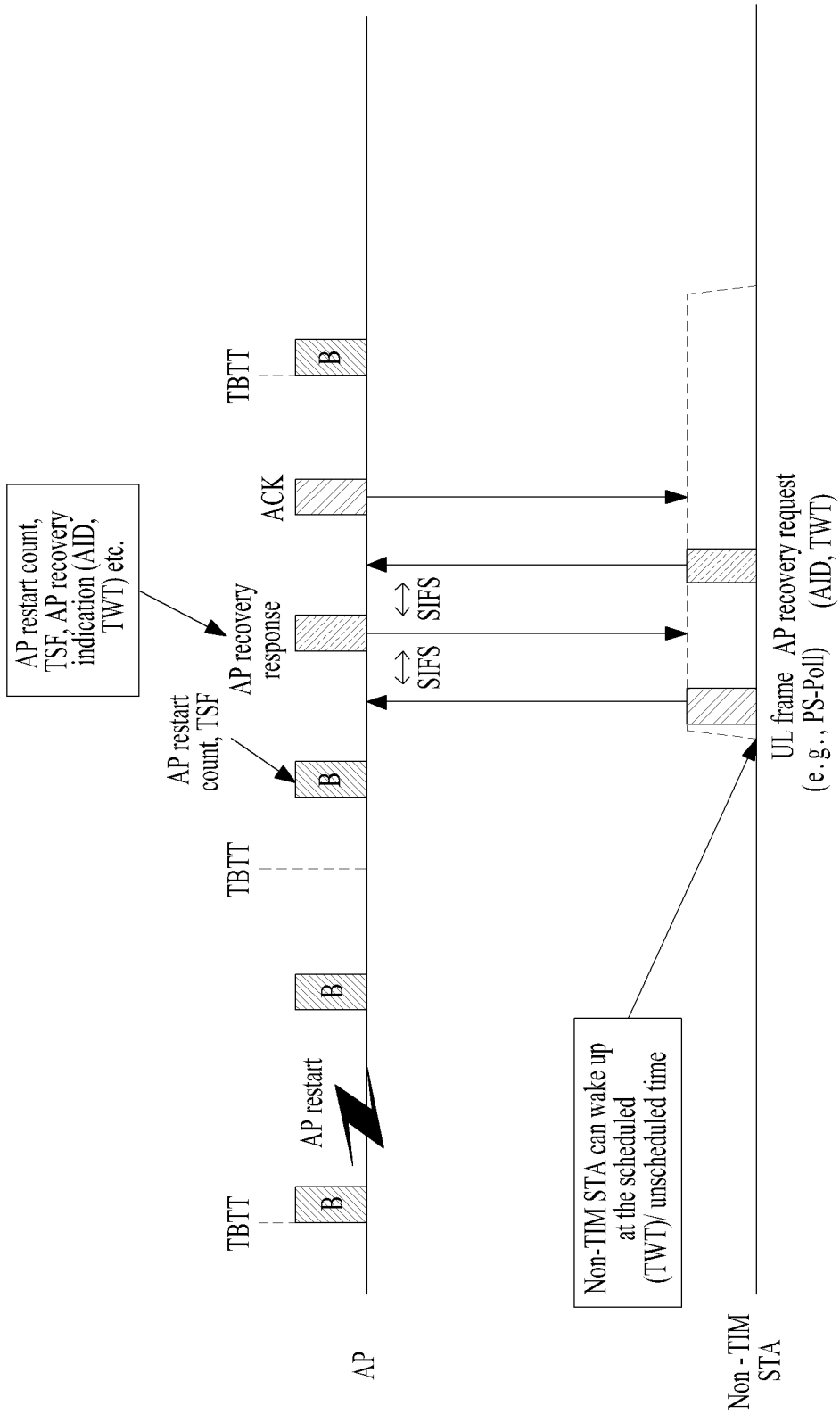

Referring to FIG. 21, the AP transmits the AP recovery response frame, receives an AP recovery request frame and transmits an ACK frame in response to the AP recovery request frame. In FIG. 21, a response frame (e.g., an ACK frame and the like) for a PS-poll frame may be used instead of the AP recovery response frame.

Items aforementioned in various embodiments of the present invention may be implemented in a manner of being independently applied. Or, the items may be implemented in a manner that two or more embodiments are simultaneously applied.

Figure 22:
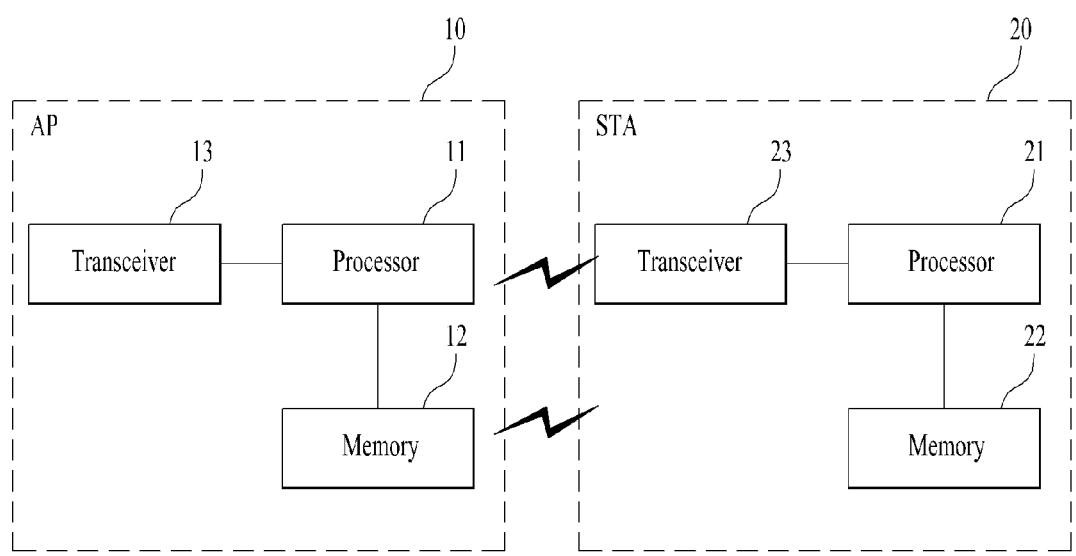
FIG. 22 is a block diagram for a configuration of a wireless communication device according to one embodiment of the present invention.

FIG. 22 is a block diagram for a configuration of a wireless communication device according to one embodiment of the present invention.

An AP 10 may include a processor 11, a memory 12 and a transceiver 13. An STA 20 may include a processor 21, a memory 22 and a transceiver 23. The transceiver 13/23 may transmit/receive a radio signal. For instance, the transceiver can implement a physical layer according to IEEE 802 system. The processor 11/21 may implement a physical layer and/or an MAC layer according to IEEE 802 system in a manner of being connected with the transceiver 13/23. The processor 11/21 may be configured to perform operations according to the aforementioned various embodiments of the present invention. A module configured to implement operations of the AP and the STA according to the aforementioned various embodiments of the present invention is stored in the memory 12/22 and may be executed by the processor 11/21. The memory 12/22 may be included in the internal of the processor 11/21 or installed in the external of the processor 11/21 and may be connected with the processor 11/21 by a means well known to public.

Concrete configuration of the AP and the STA may be implemented to make the items mentioned earlier in the various embodiments of the present invention to be independently applied or make two or more embodiments to be applied at the same time.

Embodiments of the present invention may be implemented using various means. For instance, embodiments of the present invention may be implemented using hardware, firmware, software and/or any combinations thereof.

In the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention may be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations may be made therein without departing from the spirit and scope of the invention. Thus, it is intended that the present invention covers the modifications and variations of this invention that come within the scope of the appended claims and their equivalents.

INDUSTRIAL APPLICABILITY

Although various embodiments according to the present invention are explained centering on an example applied to IEEE 802.11 system, the embodiments of the present invention may be applied to various wireless access systems using an identical scheme.

What is claimed is:

1. A method of receiving a downlink signal received by a station (STA) from an access point (AP) in a wireless communication system, comprising the steps of:
    transmitting an uplink frame; and
    receiving a response frame in response to the uplink frame,
    wherein the STA performs re-association with the AP when restart of the AP is detected according to the response frame.

2. The method of claim 1, wherein whether the AP is restated is checked by an AP restart count contained in the response frame.

3. The method of claim 2, wherein the STA detects that the AP is restarted when the AP restart count is greater than a stored AP restart count.

4. The method of claim 2, wherein the response frame comprises at least one of a TSF (time stamp field) and AP recovery indication.

5. The method of claim 4, wherein the AP recovery indication comprises at least one of an AID (association identifier), TWT (target wake-up time), TSF and MAC header information.

6. The method of claim 5, wherein the recovery indication corresponds to indication indicating to transmit an information element contained in the recovery indication.

7. The method of claim 1, wherein performing the re-association comprising the steps of:
transmitting an AP recovery request to the AP; and
receiving an AP recovery response from the AP.

8. The method of claim 7, wherein the AP recovery request comprises an information element included in AP recovery indication contained in the response frame.

9. The method of claim 8, wherein the information element contained in the AP recovery indication is used for updating a corresponding information element of the AP.

10. The method of claim 1, wherein the STA further receives an ACK frame before the response frame is received.

11. The method of claim 10, wherein the ACK frame indicates that the response frame is to be transmitted.

12. The method of claim 1, wherein the STA transmits the uplink frame in TWT (target wake-up time) or a listen interval.

13. The method of claim 1, wherein the STA corresponds to a non-TIM (traffic indication MAP) STA.

14. The method of claim 1, wherein the response frame corresponds to one selected from the group consisting of an ACK frame, an NDP (null data packet) ACK frame, a downlink data frame and a response frame.

15. The method of claim 1, wherein the uplink frame corresponds to one selected from the group consisting of a PS-poll frame, a trigger frame and an uplink data frame.

16. A station (STA) in a wireless communication system, comprising:
a transceiver configured to transceive a radio signal; and
a processor,
wherein the processor configured to:
transmit an uplink frame,
receive a response frame in response to the uplink frame,
perform re-association with an AP when restart of the AP is detected according to the response frame.

* * * * *